United States Patent [19]

Matsuno et al.

[11] Patent Number: 5,651,112

[45] Date of Patent: Jul. 22, 1997

[54] INFORMATION PROCESSING SYSTEM HAVING PERFORMANCE MEASUREMENT CAPABILITIES

[75] Inventors: Atsushi Matsuno, Hitachi; Masanori Naito, Hitachiota; Hiroshi Kobayashi, Katsuta; Masanori Horie, Ibaraki-ken; Hideki Sato, Katsuta; Masayuki Tanji, Hitachi; Shigeaki Wada, Katsuta; Toshimasa Saika, Hitachiota, all of Japan

[73] Assignees: Hitachi, Ltd., Tokyo; Hitachi Process Computer Engineering, Inc., Hitachi, both of Japan

[21] Appl. No.: 605,688

[22] Filed: Feb. 22, 1996

Related U.S. Application Data

[63] Continuation of Ser. No. 220,422, Mar. 30, 1994, abandoned.

[30] Foreign Application Priority Data

Mar. 30, 1993 [JP] Japan .................................. 5-072485

[51] Int. Cl.[6] ........................................................ G06F 11/00
[52] U.S. Cl. ............................... 395/184.01; 395/183.22
[58] Field of Search ........................ 395/184.01, 183.06, 395/183.07, 183.15, 183.22, 180

[56] References Cited

U.S. PATENT DOCUMENTS

| | | | |
|---|---|---|---|
| 4,729,124 | 3/1988 | Hansel et al. | 371/18 |
| 4,924,383 | 5/1990 | Suzuki | 395/184.01 |
| 4,933,941 | 6/1990 | Eckard et al. | 371/18 |
| 4,953,165 | 8/1990 | Jackson | 371/16.1 |
| 4,984,239 | 1/1991 | Suzuki et al. | 371/16.1 |
| 5,005,172 | 4/1991 | Kawamoto | 371/18 |
| 5,157,781 | 10/1992 | Harwood et al. | 395/575 |
| 5,163,052 | 11/1992 | Evans et al. | 371/18 |
| 5,185,693 | 2/1993 | Loftis et al. | 371/9.1 |
| 5,253,359 | 10/1993 | Spix et al. | 371/18 |
| 5,274,797 | 12/1993 | Barlow et al. | 371/78 |
| 5,325,518 | 6/1994 | Bianchini, Jr. | 371/20.1 |
| 5,327,435 | 7/1994 | Warchol | 371/18 |
| 5,367,670 | 11/1994 | Ward et al. | 395/184.01 |

FOREIGN PATENT DOCUMENTS

| | | |
|---|---|---|
| 1123441 | 1/1989 | Japan . |
| 2287736 | 11/1990 | Japan . |

*Primary Examiner*—Robert W. Beausoliel, Jr.
*Assistant Examiner*—Joseph E. Palys
*Attorney, Agent, or Firm*—Kenyon & Kenyon

[57] ABSTRACT

An information processing system capable of performance measurement by the use of a small amount of mounted hardware. The information processing system having central processors installed therein comprises a control circuit, and a performance measurement validation register for specifying whether a performance measurement function is valid or invalid. In a case where the validity of the measurement function has been specified by the register, the control circuit operates one loop in a duplex configuration as a performance measurement facility. At this time, counter #1–counter #3 are used as counters for totalizing performance information. On the other hand, in a case where the invalidity of the measurement function has been specified, both loops in the duplex configuration are operated as the central processors. At this time, the counter #1–the counter #3 are used as timer counters for controlling buses.

7 Claims, 26 Drawing Sheets

TOTAL DATA OF "START ~ END"
(FOR PROCESS)   901

| NUMBER OF EXECUTION STEPS |
| --- |
| — |
| — |
| NUMBER OF EXECUTION MACHINE CYCLES |
| — |
| — |
| — |

— : UNUSED

FIG.9A

TOTAL DATA OF "START ~ END"
(FOR TASK)   902

| AVERAGE NUMBER OF EXECUTION STEPS |
| --- |
| MAXIMUM NUMBER OF EXECUTION STEPS |
| MINIMUM NUMBER OF EXECUTION STEPS |
| AVERAGE NUMBER OF EXECUTION MACHINE CYCLES |
| MAXIMUM NUMBER OF EXECUTION MACHINE CYCLES |
| MINIMUM NUMBER OF EXECUTION MACHINE CYCLES |
| NUMBER OF TIMES OF TASK ENDS |

FIG.9B

DISPLAY #1: THE INTEGRAL VALUE OF PERFORMANCE INFORMATION FOR A TIME PERIOD FROM THE START OF A PROCESS TO THE CURRENT TIME IS DISPLAYED AS TO THE PROCESS

EACH OF DISPLAYS #2 ~ #5: THE DIFFERENTIAL VALUE OF PERFORMANCE INFORMATION FOR A TIME PERIOD FROM THE TIME POINT OF THE LAST DISPLAY TO THE CURRENT TIME IS DISPLAYED AS TO THE PROCESS

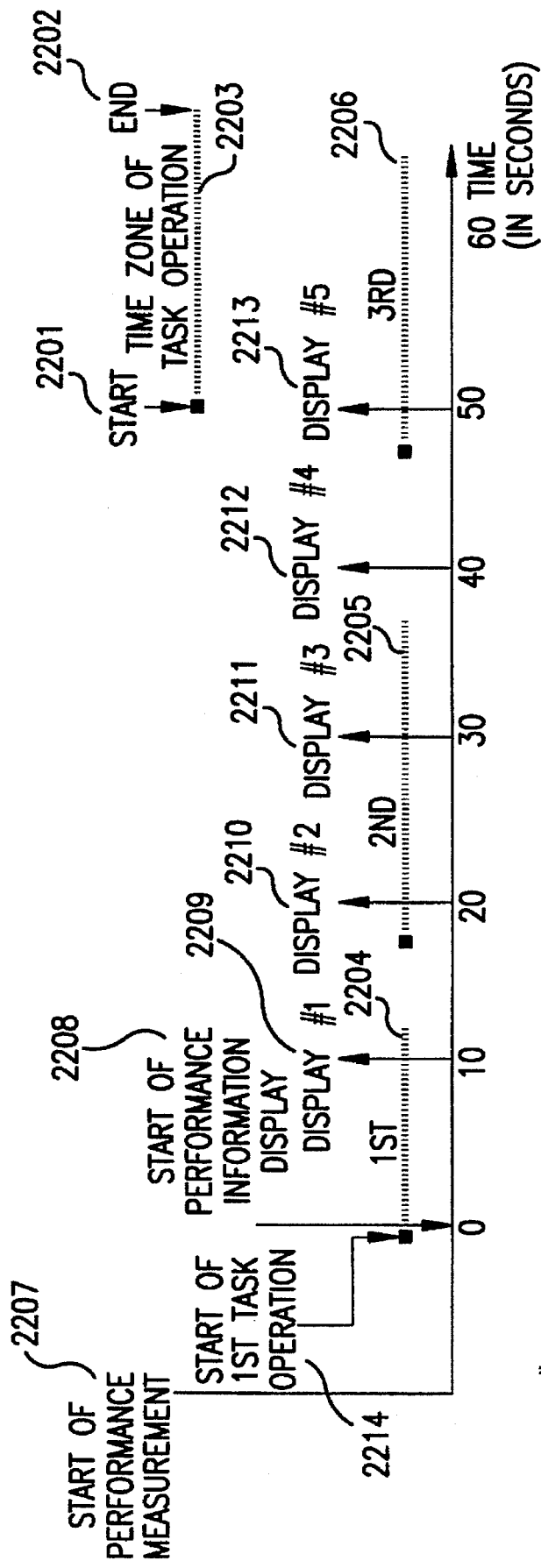

FIG.22

DISPLAY #1: THE MEASURED VALUE OF PERFORMANCE INFORMATION FOR A TIME PERIOD FROM THE TIME POINT OF THE START OF A TASK TO THE CURRENT TIME IS DISPLAYED AS TO THE 1ST TASK OPERATION

DISPLAY #2: THE MEASURED VALUE OF PERFORMANCE INFORMATION FOR A TIME PERIOD FROM THE START OF A TASK TO THE END THEREOF IS DISPLAYED AS TO THE 1ST TASK OPERATION

DISPLAY #3: DITTO

DISPLAY #4: THE AVERAGE OF THE MEASURED VALUES OF PERFORMANCE INFORMATION IS DISPLAYED AS TO THE 1ST AND 2ND TASK OPERATIONS

DISPLAY #5: DITTO

| NO. | SUBPROGRAM NAME | ADDRESS |
|---|---|---|
| 0 | SUB 0 | ADDR 0 |
| ⋮ | ⋮ | ⋮ |
| n | SUB n | ADDR n |
| ⋮ | ⋮ | ⋮ |
| N−1 | SUBN−1 | ADDRN−1 |

INFORMATION PROCESSING SYSTEM HAVING PERFORMANCE MEASUREMENT CAPABILITIES

This application is a continuation of application Ser. No. 08/220,422, filed on Mar. 30, 1994, now abandoned.

BACKGROUND OF THE INVENTION

1. Field of the Invention

The present invention relates to an information processing system, and more particularly to a performance measurement in the information processing system.

2. Description of the Related Art

Heretofore, a performance measurement facility has been implemented in the form of a dedicated circuit. Also in a multiprocessor, for example, a duplex hardware configuration wherein a plurality of processors execute identical processing, the processors have performance measurement circuits mounted in duplex fashion, respectively. In the usual operating state of the duplex system, the performance measurement facilities are simultaneously operable. Since, however, the performance measurement facilities are the dedicated circuits for only performance measurements, there is the problem that the amount of mounting increases more than in the absence of the performance measurement facilities.

Moreover, for keeping many kinds of performance information in store, respective registers need to be prepared in correspondence with all the kinds of information. Accordingly, the kinds of performance information to be measured are limited in a system which can include only a limited number of registers.

Further, "UNIX profile" (trademark of AT&T) can obtain the performance information of a subprogram. However, the obtainable performance information is information on processing in the case where the subprogram is called from the specified main program (calling "UNIX profile"), and no performance information can be obtained in the state in which the subprogram is called from any desired main program, that is, in the actual operating state.

Still further, as seen from "UNIX csh" and "UNIX timex" (trademarks of AT&T), programs are so designed that the performance information of the program is not output unless the pertinent program ends. It is therefore impossible to obtain performance information midway of the actual operation (dynamic performance information).

SUMMARY OF THE INVENTION

The first object of the present invention is to provide an information processing system which includes a performance measurement facility that has its amount of mounting reduced.

The second object of the present invention is to provide an information processing system which includes a performance measurement facility that obtains performance information by the use of a limited number of memory means.

The third object of the present invention is to provide an information processing system which can obtain the performance information of a subprogram in the same state as the actual operating state of the system.

The fourth object of the present invention is to provide an information processing system in which, as to a program being actually run, data are cyclically displayed under the execution of the program.

In order to accomplish the first object, an information processing system comprises performance measurement means for fulfilling a function of accepting information for a performance measurement of the information processing system and then executing the performance measurement thereof, and a function of executing processing which is other than the performance measurement; performance measurement instruction acceptance means for accepting an instruction which indicates if the performance measurement is to be executed; and control means for receiving the instruction and then causing the performance measurement means to execute the performance measurement when the performance measurement is to be executed and causing the performance measurement means to execute the processing other than the performance measurement when the performance measurement is not to be executed.

In order to accomplish the second object, an information processing system having a plurality of performance measurement modes comprises memory means for accepting performance information for a performance measurement of the information processing system and then storing the performance information therein; performance measurement mode acceptance means for accepting an instruction which concerns the performance measurement mode; and control means for receiving the instruction and then selecting the performance information which is to be stored in the memory means.

In order to accomplish the third object, an information processing system for running a subprogram which is called from a main program so as to execute processing comprises performance measurement means for accepting information for a performance measurement of the subprogram and then executing the performance measurement thereof; first memory means for storing therein information which indicates if the performance measurement is to be executed for the subprogram; second memory means for storing performance information of the subprogram therein; and subprogram performance measurement control means for referring to the information stored in the first memory means, when the subprogram has been called, and then causing the performance measurement means to execute the performance measurement and storing the performance information obtained by the performance measurement means, in the second memory means, when the performance measurement is to be executed in accordance with a result of the reference.

In order to accomplish the fourth object, an information processing system for running a program comprises performance measurement means for accepting information for a performance measurement of the program and then executing the performance measurement thereof; and program performance measurement control means for receiving and referring to information which indicates if the performance measurement is to be executed for the program, when the program has been called, and then causing the performance measurement means to execute the performance measurement and outputting performance information obtained by the performance measurement means, every predetermined time interval, when the performance measurement is to be executed in accordance with a result of the reference.

In operation, according to the information processing system which comprises the performance measurement means for accepting the information for the performance measurement of the information processing system and then executing the performance measurement thereof, the performance measurement means is usually operating as the processor, and it functions as a common or shared circuit. This performance measurement means operates as a performance measurement facility in the state in which the performance measurement instruction acceptance means for specifying whether the performance measurement function is valid or invalid specifies the validity of the performance measurement function.

According to the information processing system having the plurality of performance measurement modes, an object to be measured is specified by the performance measurement mode acceptance means, and the control means controls the selection of the performance information in accordance with the performance measurement mode so as to store the performance information. Thus, the performance information existing in the plurality of kinds can be measured even with the limited number of memory means.

According to the information processing system for running the subprogram, the subprogram performance measurement control means stores the performance information in the second memory means in subprogram units at the point of time at which the subprogram ends.

According to the information processing system for running the program, the program performance measurement control means refers to the information indicating if the performance measurement is to be executed, when the program has been called, and it causes the performance measurement means to execute the performance measurement and outputs the obtained performance information every predetermined time interval, when the performance measurement is to be executed.

BRIEF DESCRIPTION OF THE DRAWINGS

FIG. 9 is a diagram for explaining the structures of total data of "start–end" which are contained in the performance data totalizing work area;

FIG. 22 is a diagram for explaining the display operation of the performance information of a task;

FIG. 26 is a diagram for explaining a subprogram management table;

DETAILED DESCRIPTION

Figure 1:
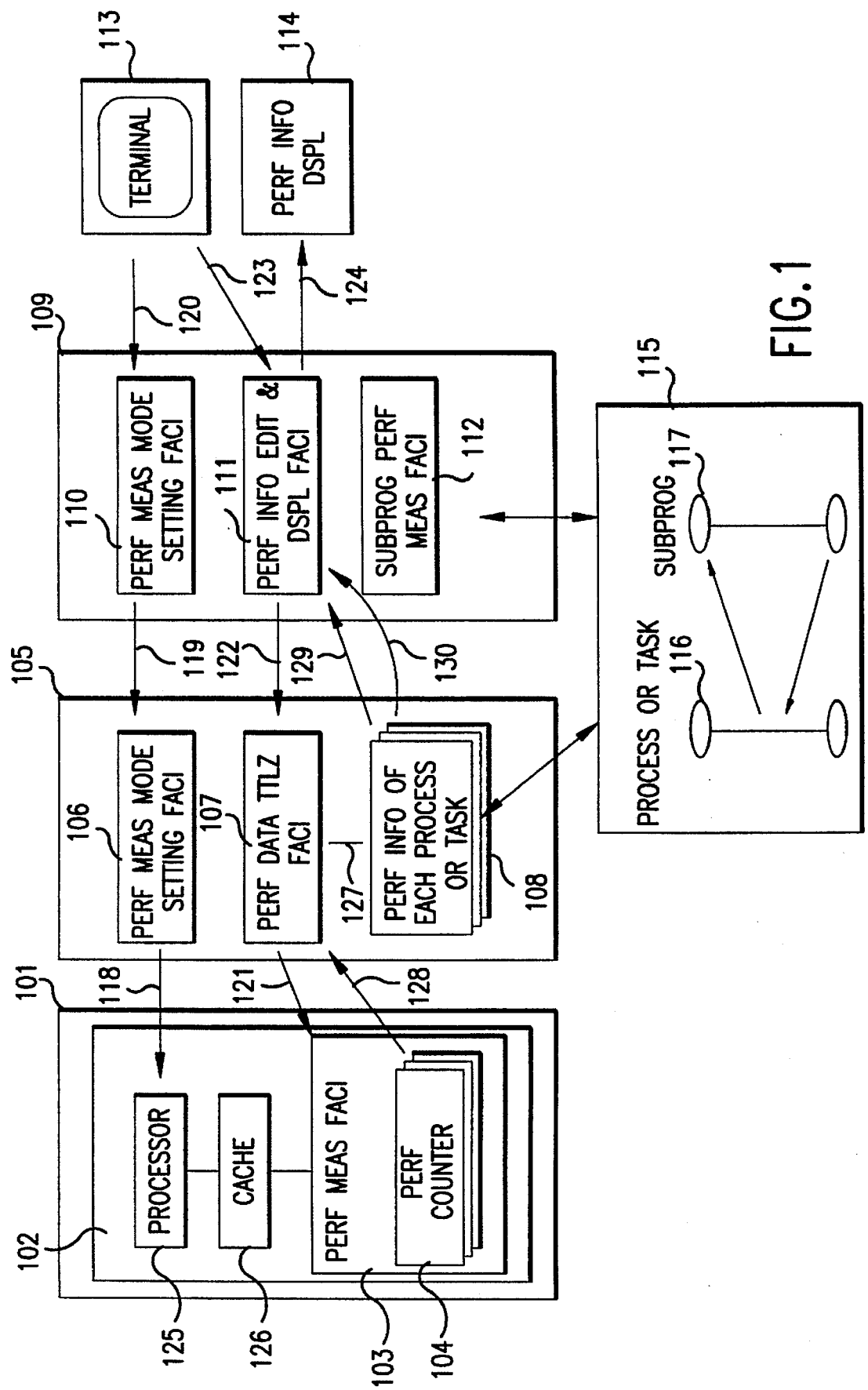
FIG. 1 is a block diagram of a computer system according to the present invention.

FIG. 1 illustrates the whole architecture of a computer system to which the present invention is applied so as to have performance measurement facilities. The illustrated embodiment implements the performance measurement facilities in such a way that functions for performance measurements are respectively incorporated into hardware 101, an operating system (OS) 105 and a support utility 109.

The computer system comprises the hardware 101, the operating system 105, the support utility 109, a terminal 113 and a performance information display unit 114. The hardware 101 includes a basic processing unit (BPU) 102, which in turn includes processors 125, a cache 126, and the performance measurement facilities 103 being performance measurement means. Each of the performance measurement facilities 103 has performance counters 104.

Figure 2:
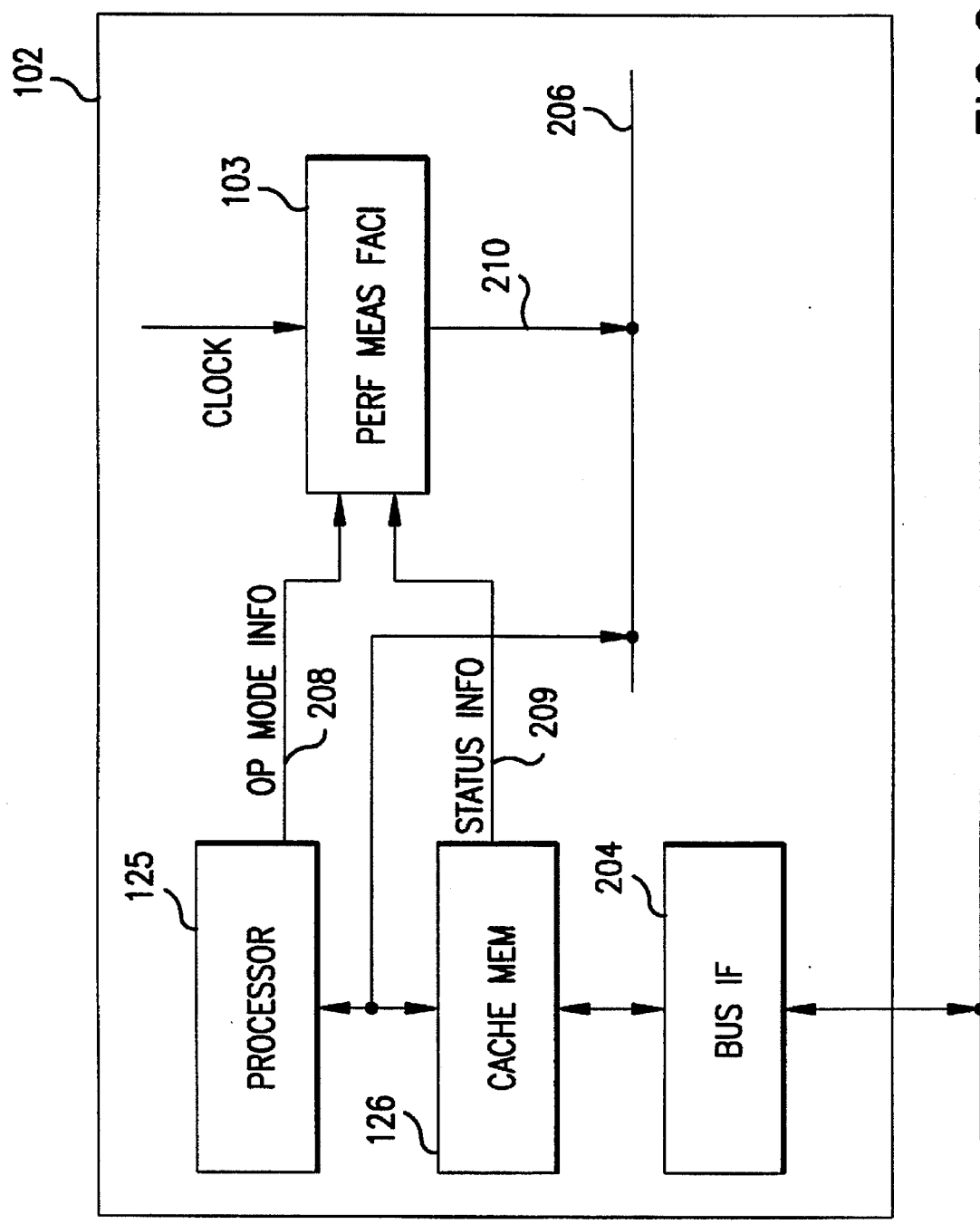
FIG. 2 is a block diagram of a BPU (basic processing unit)
Figure 3:
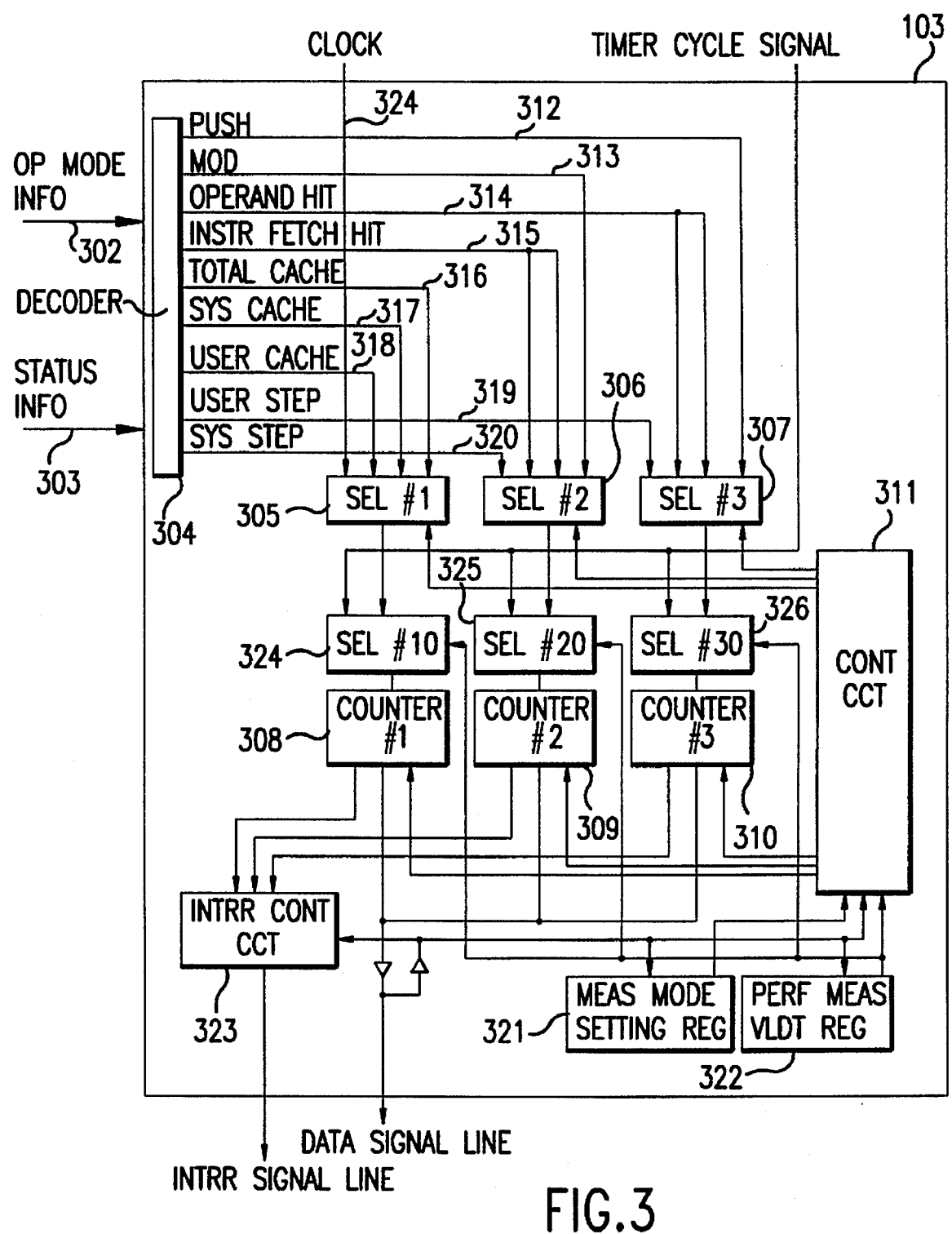
FIG. 3 is a block diagram of a performance measurement facility.
Figure 4:
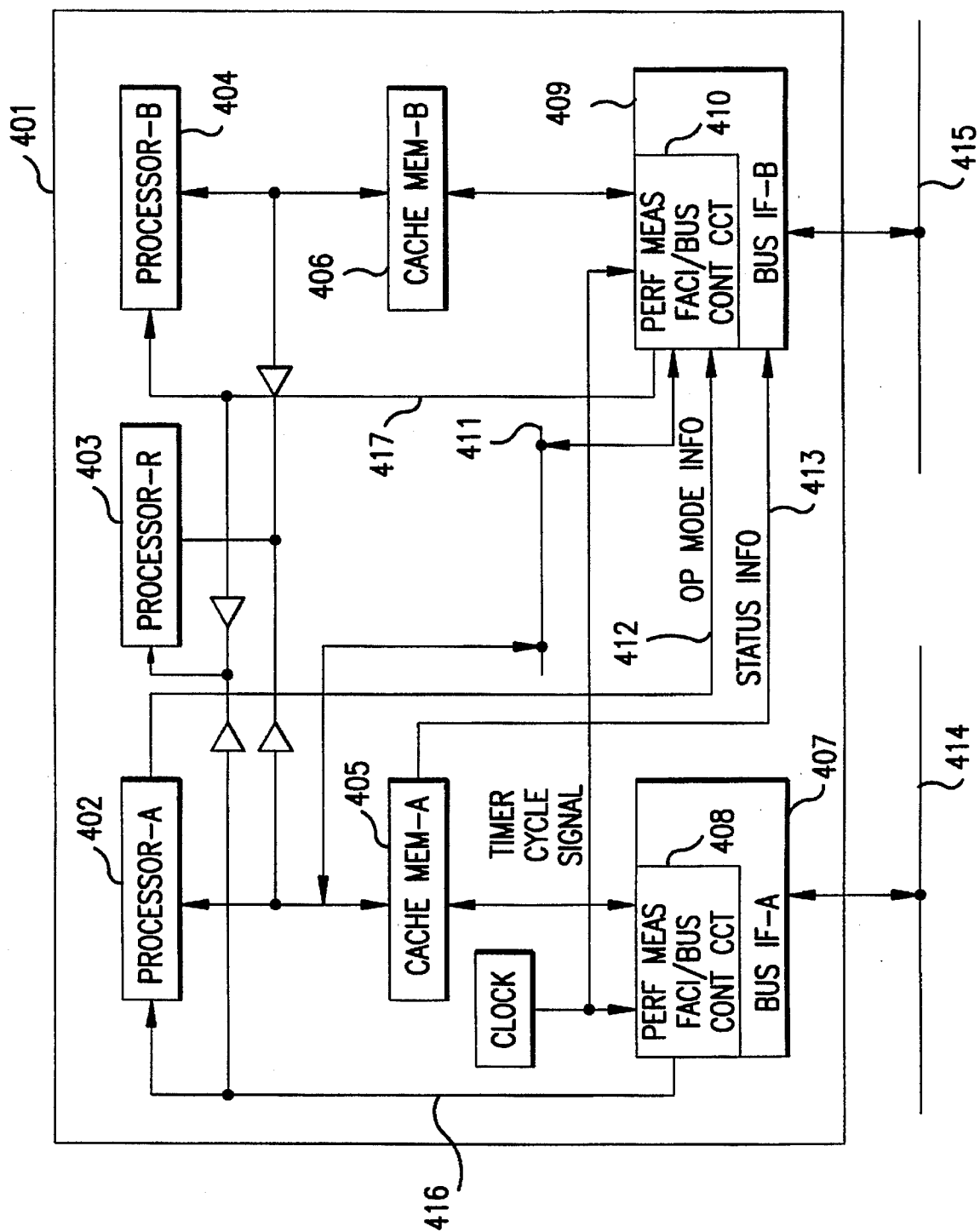
FIG. 4 is a block diagram of the redundant BPU.

In the computer system, a plurality of processors 125 and performance measurement facilities 103 may be included within one BPU 102. In FIGS. 1 thru 3, however, only one processor 125 and one performance measurement facility 103 shall be shown within the BPU 102. The details of the interior of the BPU 102 are shown in FIG. 4.

The operating system 105 includes a performance measurement mode setting facility 106 and a performance data totalization facility 107. The performance data totalization facility 107 totalizes the performance information 108 of each process or each task. On the other hand, the performance measurement support utility 109 includes a performance measurement mode setting facility 110, a performance information edit and display facility 111 and a subprogram performance measurement facility 112. The subprogram performance measurement facility 112 handles any of a process or task 116 and a subprogram 117 as an object to-be-measured 115.

The performance measurement facility 103 is implemented in the basic processing unit 102 which is mounted as the hardware 101. This performance measurement facility 103 accumulates the performance information which is obtained from the operation mode information of the processor 125 and the status information of the cache memory 126. The result of the accumulation is logged in the performance counter 104.

The operating system 105 is configured of the performance measurement mode setting facility 106 which sets a performance measurement mode upon receiving an instruction 119 through the interface of an operating system call from the performance measurement support utility 109, and the performance data totalization facility 107 in which the data measured by the hardware 101 are totalized as the performance data 108 of each process or each task being the unit of program execution in the operating system 105.

The performance measurement support utility 109 chiefly functions to initiate the performance measurement in compliance with the instruction of a performance measurer (the user or operator of the computer system) and to offer the measurer the performance information. This performance measurement support utility 109 is configured of the performance measurement mode setting facility 110 which sets the performance measurement mode in compliance with the measurer's instruction, the performance information edit and output facility 111 which displays the performance information, and the subprogram performance measurement processing facility 112 which executes the performance measurement as to the subprogram 117 of the object to-be-measured 115.

Using the terminal 113, the measurer gives the performance measurement mode setting facility 110 the instruction which specifies the process or task 116 or the subprogram 117 of the object to-be-measured 115 and the kind of the performance information to be obtained. The instruction is transferred to the performance measurement mode setting facility 106 of the operating system 105 through the system call interface 119, and the operating system 105 sets the performance measurement mode of the hardware 101 in a register within the performance measurement facility 103. The hardware 101 accumulates the performance information in the performance counter 104 in accordance with the performance measurement mode.

When the program of the object to-be-measured 115 specified by the measurer has begun to run as the process under the operating system 105, the performance data totalization facility 107 of the operating system 105 controls the performance measurement facility 103 of the hardware 101 so as to totalize and obtain only the performance information on the operation of the pertinent program. In due course, the performance data is reported to the measurer by the performance information edit and output facility 111 at the point of time designated by the measurer. Since the subprogram 117 is run as part of the process or task 116, the operating system 105 grasps the performance data of the subprogram as being contained in the performance data of the process. Therefore, the data of each subprogram is extracted and stored. This data is also reported to the measurer at the point of time designated by him/her (124).

Now, the hardware 101, operating system 105 and performance measurement support utility 109 will be individually described.

The hardware 101 obtains the performance information by the performance measurement facility 103 which is mounted in the basic processing unit (BPU) 102. FIG. 2 illustrates the whole construction of the hardware 101. The performance measurement facility 103 is disposed in the BPU 102 which includes the processor 125, the cache memory 126 and a bus interface 204. This performance measurement facility 103 decodes the operation mode information 208 delivered from the processor 125 and the status information 209 of the cache memory 126, thereby obtaining the performance information indicated in Table 1. The performance information counted by the performance counter 104 (corresponding to counters #1 (308)–#3 (310) shown in FIG. 3) of the performance measurement facility 103 is delivered to a data signal line 210 and is read out through an internal data bus 206. The bus interface 204 and a system bus 207 are interconnected.

FIG. 3 illustrates the fundamental construction of the performance measurement facility 103. This performance measurement facility 103 has the function of accepting information for the performance measurement and then executing the performance measurement, and the function of executing processing which is other than the performance measurement. It includes a decoder 304, a performance measurement validation register 322 which accepts an instruction indicating if the performance measurement is to be executed, a measurement mode setting register 321 which is means for accepting the performance measurement mode, a control circuit 311 which receives the above instruction and which causes the performance measurement means to execute the performance measurement when this performance measurement is to be executed and to execute the processing other than the performance measurement when this performance measurement is not to be executed, selectors #10 (324)–#30 (326), and the aforecited counters #1 (308)–#3 (310) which accept and store the performance information.

In a case where the performance measurement validation register 322 is reset, a timer cycle signal is input to the counters #1 (308)–#3 (310) by the selectors #10 (324)–#30 (326), and the counters #1 (308)–#3 (310) operate as timer counters for controls etc., respectively.

The counter #1 (308) is used, for example, when the measurer wants to display the performance information every fixed time period (e.g., 10 [sec.]). In this example, the counter #1 (308) undergoes interrupts at the regular intervals of the time period and makes the lapses of the fixed time period known to the measurer. The counter #2 (309) is used for successively switching a plurality of processes or tasks every fixed time period when the operating system (OS) 105 deals with the processes or tasks in time division. The counter #3 (310) is an actual-time timer which is used for the measurer to know an actual time. The count value of this counter #3 (310) can also be read out of the bus (206), not through an interrupt operation.

The outputs of the respective counters #1 (308)–#3 (310) are entered into an interrupt control circuit 323. The interrupt control circuit 323 generates an interrupt signal upon judging the occurrence of an interrupt from the outputs of the counters #1 (308)–#3 (310). Subsequently, the interrupt control circuit 323 sends the interrupt signal to the pertinent one of a processor-A (402 in FIG. 4), a processor-B (404) and a processor-R (403) to be explained later. The interrupt signal is transferred to the pertinent processor through an interrupt signal line.

On the other hand, in a case where the performance measurement validation register 322 is set, the performance information is input to the counters #1 (308)–#3 (310) by the selectors #10 (324)–#30 (326).

Owing to the above operations, the counters #1 (308)–#3 (310) can be shared by the performance measurement function and the central processor function.

The performance measurement facility 103 obtains the performance information signal in the way that the signals of the operation mode information (indicating either a user mode or a system mode) 302 of the processor (125) and the status information 303 of the cache memory (126) are decoded by the decoder 304.

The performance information contains the "push" information 312 of a cache (information on the number of times which cache data have been written into a main memory), the "modify" information 313 of the cache (information on the number of times which the cache data have been modified), the "hit" information 314 of the data cache, the "hit" information 315 of an instruction cache, total cache access information 316, cache access information 317 in the system mode, cache access information 318 in the user mode, execution information 319 in the user mode, execution information 320 in the system mode, and a clock 324. The performance counters 104 for counting the performance information are in the number of three (the counters are denoted by the numerals 308, 309 and 310), and they count up the performance information items listed in Table 1, respectively.

The redundant BPU 401 is constructed for the purpose of preventing a system failure ascribable to any single fault. This redundant BPU 401 executes identical processing by all the processors 402, 403 and 404 (corresponding to the processor 125 in FIG. 1) and compares the results of the processing, thereby finding out any faulty one of the processors 402–404. In a case where the processed result of one processor differs from those of the other two processors by the comparisons of the processed results of the three processors 402–404, the processor is disconnected from the computer system as being faulty. The processing is thereafter continued by the other two processors, and the faulty processor is repaired or replaced in the meantime. If the processed results of both the processors differ during the system operation based on the two processors, the computer system is stopped.

The redundant BPU 401 is configured of the three processors 402, 403, 404, duplex cache memories 405, 406 (corresponding to the cache memory 126 in FIG. 1), and duplex bus interface circuits 407, 409. The bus interface circuits 407 and 409 include performance measurement facility/bus control circuits 408 and 410 (corresponding to

TABLE 1

PERFORMANCE MEASUREMENT MODES AND MEASUREMENT CONTENTS

| Measurement Mode | STEP | HITU | HITS | MOD |
|---|---|---|---|---|
| Value of Setting Register | 0 | 1 | 2 | 3 |
| Counter #1 | Number of executed cycles | Number of times of cache accesses in user mode | Number of times of cache accesses in system mode | Total number of times of cache accesses |
| Counter #2 | Number of executed steps in system mode | Number of times of cache hits in instruction fetches | Number of times of cache hits in instruction fetches | Number of times of modifications of cache data |
| Counter #3 | Number of executed steps in user mode | Number of times of cache hits in operand accesses | Number of times of cache hits in operand accesses | Number of times of pushes of cache data |

In the measurement mode columns of Table 1, "STEP" signifies the mode which measures executed steps, "HITU" the mode which measures the number of times of hits to the cache memory in the user mode, "HITS" the mode which measures the number of times of hits to the cache memory in the system mode, and "MOD" the mode which measures the number of times of the modifications of the cache data.

One of the decoded performance information items is selected by each of selectors #1 (305)–#3 (307) in accordance with the content of the measurement mode setting register 321 in which the mode indicated in Table 1 is set. Consequently, only the selected information items are respectively counted up by the counters #1 (308)–#3 (310) through the selectors #10 (324)–#30 (326). That is, although there are the four kinds of information items, one kind of information items are selected by the selectors 305–307, and only the selected information items are respectively counted by the counters 308–310. The selectors 305, 306 and 307 and the counters 308, 309 and 310 have their operations controlled by the control circuit 311 so as to effect the selection of the information, the start/stop of the countup and the readout of the information.

FIG. 4 illustrates the construction of the redundant basic processor unit 401 (BPU 102) in the case where the performance measurement facility 103 is mounted in the hardware 101.

the performance measurement facility 103 in FIG. 1) each of which is a shared or common device serving both as a performance measurement facility and as a bus controller, respectively. Incidentally, numeral 411 in FIG. 4 denotes an internal data bus, numeral 414 a system bus (system bus-A), and numeral 415 another system bus (system bus-B).

In that usual operation of the computer system in which the performance measurement is not executed, the performance measurement facility/bus control circuits 408 and 410 operate as the bus controllers in both the loop-A and loop-B of the duplex system. The performance measurement facility/bus control circuits 408 and 410 and the processor-A (402), processor-B (404) and processor-R (403) are held in correspondence with one another as follows: The processor-A corresponds to the shared circuit 408, while the processor-B corresponds to the shared circuit 410. Either of the shared circuits 408 and 410 can be selected regarding the processor-R.

On the other hand, during the operation of the computer system in the performance measurement mode, only the bus controller portion is operated in the performance measurement facility/bus control circuit 408 of the loop-A, whereas only the performance measurement facility portion is operated in the performance measurement facility/bus control circuit 410 of the loop-B. During the operation in the performance measurement mode, accordingly, the redundant BPU 401 operates in only one loop (loop-A), and it is incapable of realizing the prevention of the failure at the occurrence of the single fault as is originally intended. The illustrated example, however, permits the performance measurement circuits to be mounted with the small amount of mounting by sharing the bus controller portions and the performance measurement facility portions.

In the case where the performance measurement validation register (322 in FIG. 3) included in the performance measurement facility/bus control circuit 410 is reset, an interrupt signal line 417 operates similarly to an interrupt signal line 416 so as to effect the duplex operation.

In contrast, in the case where the performance measurement validation register (322) in the performance measurement facility/bus control circuit 410 is set, the interrupt signal line 417 becomes inoperable to validate the operation mode information 412 of the processor-A 402 and the status information 413 of the cache memory-A 405, so that the shared circuit 410 operates as the performance measurement facility. In this way, the performance measurement facility/bus control circuit 408 within the redundant BPU 401 fulfills the central processor function, while at the same time, the performance measurement facility/bus control circuit 410 can fulfill the performance measurement function.

The operating system 105 applied in this embodiment involves the two sorts of programs; the tasks and the processes. The tasks are chiefly utilized for online transactions, They are ordinarily started automatically by other programs, and are rarely started directly by the user. The processes are chiefly utilized for user interfaces, and they are started by the manual operations of the user as may be needed. They are for the purposes of development transactions, watching online statuses, etc.

Figure 5:
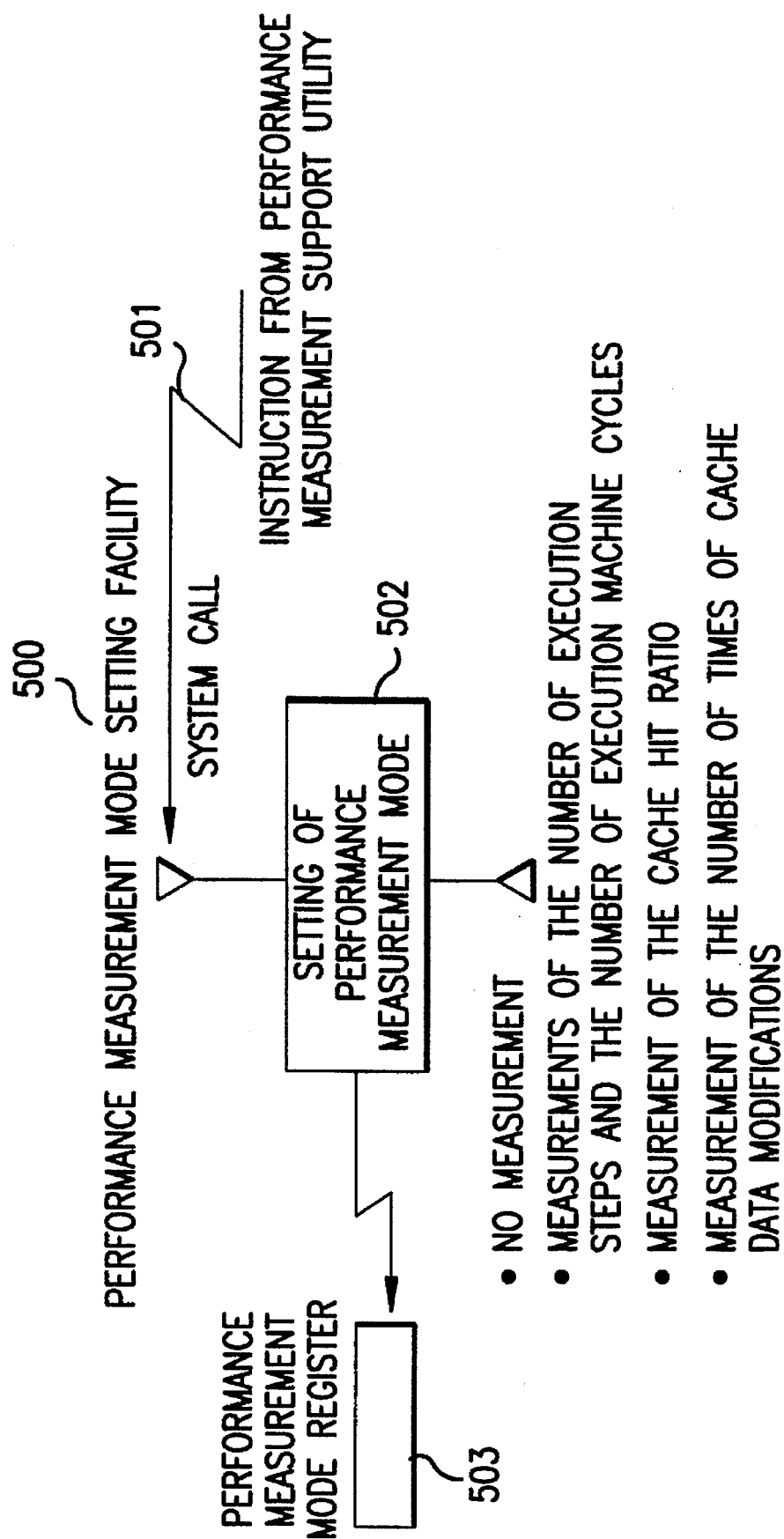
FIG. 5 is a diagram for explaining a performance measurement mode setting facility which is included in an operating system.

The performance measurement facilities of the operating system 105 consist of the following two:

(1) Performance measurement mode setting facility (2) Performance data totalization facility FIG. 5 illustrates the performance measurement mode setting facility 500 (106 in FIG. 1) of the operating system 105. In compliance with a system call instruction 501 from the performance measurement support utility 109, the performance measurement mode setting facility 500 of the operating system 105 operates to set the following classification in a performance measurement mode register 503 (as indicated at numeral 502):

Measurements of the number of executed steps and the number of executed machine cycles (when the measurement mode in Table 1 is "STEP")

Measurement of the cache hit ratio (when the measurement mode in Table 1 is "HITU" or "HITS")

Measurement of the number of times of cache data modifications (when the measurement mode in Table 1 is "MOD")

No measurement (selected by the performance measurement validation register 322 in FIG. 3)

The "performance measurement mode register" 503 in FIG. 5 corresponds to the "measurement mode setting register" 321 and "performance measurement validation register" 322 in FIG. 3. The items which are set by the performance measurement mode setting facility 500 in FIG. 5, correspond to the contents of the registers 321 and 322 as follows:

| Items | Performance measurement validation register (322) | Measurement mode setting register (321) |
|---|---|---|
| End (No measurement) | 0 (Invalid) | – |
| Start (Number of executed steps, number of executed machine cycles) | 1 (Valid) | 0 (STEP) |
| Start (Cache hit ratio in user mode) | 1 (Valid) | 1 (HITU) |
| Start (Cache hit ratio in system mode) | 1 (Valid) | 2 (HITS) |
| Start (Number of times of cache data modifications) | 1 (Valid) | 3 (MOD) |

When the "performance measurement validation register" becomes "1" (valid), the hardware 101 carries out the performance measurement specified by the "measurement mode setting register", and the operating system (OS) 105 executes processing relevant to the performance measurement.

Figure 19:
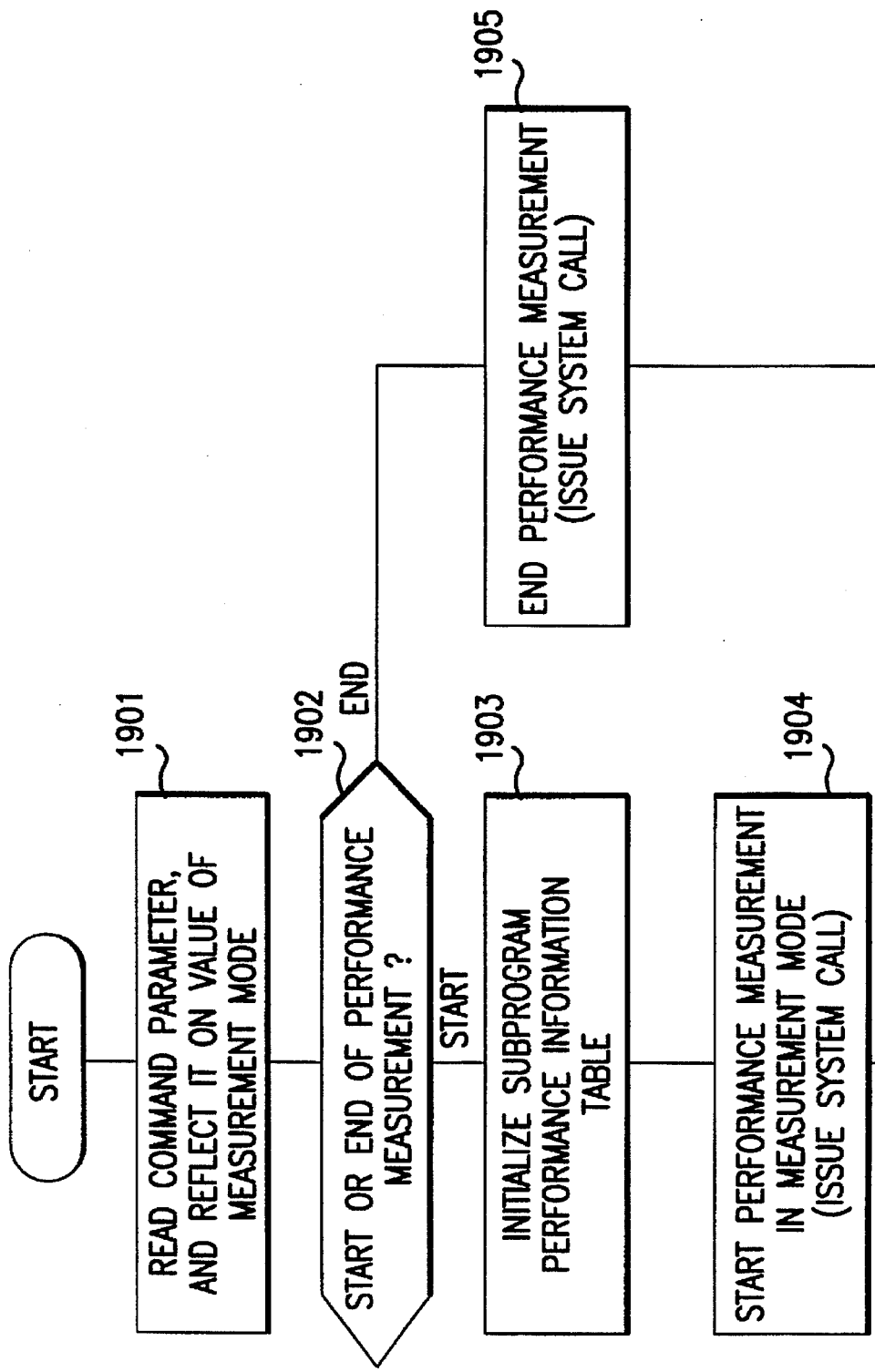
FIG. 19 is a flow chart showing the processing of the performance measurement mode setting facility.

The system call 501 in FIG. 5 calls the service of the OS 105 in a subroutine format, and it is issued at a step 1904 in FIG. 19 in order to start the performance measurement. The user causes the hardware 101 and the OS 105 to execute the performance measurement by processing which passes the step 1904 in FIG. 19 (instructions for starting the performance measurement and for setting the measurement mode). The measured performance information (obtained at a step 2003 in FIG. 20) is displayed by a performance information edit and display facility in FIG. 20 (corresponding to the facility 111 in FIG. 1).

Besides, a system call which is used for ending the performance measurement and which is indicated at a step 1905 in FIG. 19 is the system call 501 shown in FIG. 5.

The processing in FIG. 5 is executed at a step 1901 in FIG. 19 to be explained later.

In executing the performance measurement, the user does the setting operation and gives the performance measurement starting instruction on the terminal 113 so as to activate the performance measurement mode setting facility 110 of the performance measurement support utility 109 before he/she starts the program of the object to-be-measured 115 on the terminal 113. Upon receiving the start instruction, the performance measurement mode setting facility 110 transfers the instruction to the performance measurement mode setting facility 106, which executes works for the start of the performance measurement at steps 1902 and 1903 in FIG. 19. On the other hand, in ending the performance measurement, the user gives the performance measurement ending instruction on the terminal 113. Then, the performance measurement mode setting facility 106 executes works for the end of the performance measurement at the steps 1902 and 1905 in FIG. 19. On this occasion, the performance measurement is ended irrespective of whether or not the program to-be-measured is under run.

Next, the flow of the processing of the operating system 105 at the time at which the user has started the program to-be-measured on the terminal 113 will be explained, followed by the explanation of the performance data totalization facility 107.

Figure 6:
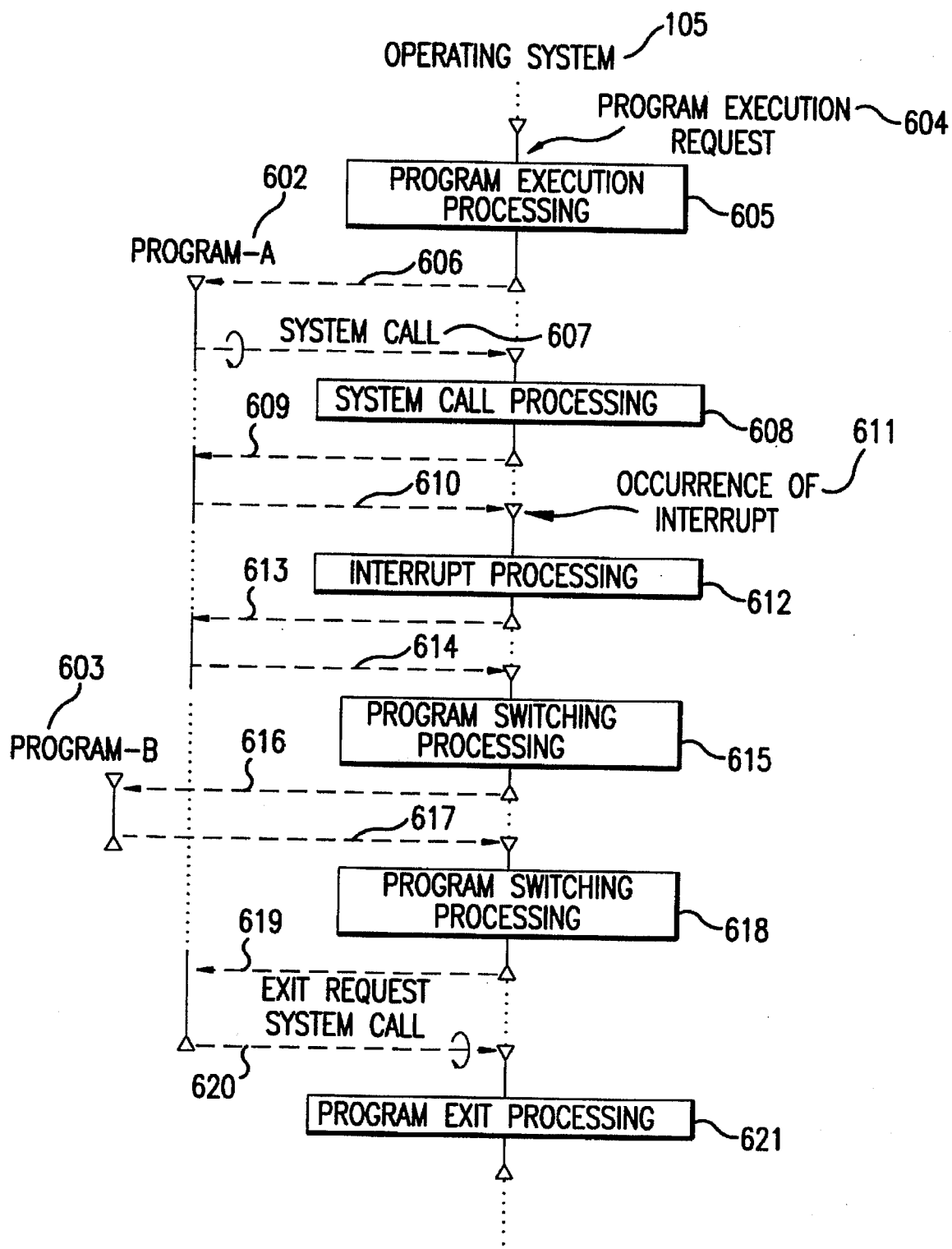
FIG. 6 is a diagram for explaining the flow of a program from the start to the end thereof.

FIG. 6 illustrates the program processing flow of the operating system 105 since the start of the program till the end thereof.

Numerals 605, 608, 612, 615, 618 and 621 in the figure denote processing items which the operating system 105 executes ordinarily in executing programs-A and -B. In the case of executing the performance measurement, the processing required for the performance measurement is also contained in each of the processing items. There will be first stated steps which are done in common by the processing items irrespective of the execution or non-execution of the performance measurement, and thereafter the details of each processing item in the case of executing the performance measurement will be stated.

When the operating system 105 receives a program execution request 604 for the program-A 602, it executes the program execution processing 605 so as to start the program-A 602 (606).

Subsequently, when the program-A 602 issues a system call 607 in order to ask the operating system 105 for processing, the control of the computer system shifts to the operating system 105. The control returns to the program-A 602 at the time of the end of the system call processing 608 (609). When any interrupt 611 such as an end report from an I/O device occurs, the control shifts to the operating system 105 (610) until it returns to the program-A 602 after the end of the interrupt processing 612 (613). In a case where, amidst the run of the program-A 602, the run of the program-B 603 higher in priority than the program-A 602 has become necessary, the control shifts to the operating system 105 (614), which executes the program switching processing 615 and thereafter shifts the control to the program-B 603 (616). When the program-B 603 of higher priority has been entirely run or falls into a wait state (617), the operating system 105 executes the program switching processing 618 again. Thereafter, the control returns to the program-A 602 (619). When to exit, the program-A 602 issues an exit request system call (620). In compliance with the exit request, the operating system 105 executes the program exit processing 621 so as to end the run of the program-A 602.

Although the hardware 101 includes one set of performance counters 104, the operating system 105 runs the plurality of programs while switching them, in order to apparently execute the plurality of programs concurrently. Therefore, the data read from the performance counters 104 of the hardware 101 need to be distributed to the individual programs.

There will now be explained an example in the case where the performance data totalization facility (107 in FIG. 1), which reads the data of the performance counters 104 of the hardware 101 and which distributes and totalizes the data every program, is incorporated into the flow of the series of processing items of the operating system 105 as shown in FIG. 6.

The performance data totalization facility consists of the following two functions:

(1) Performance data distribution/totalization function

Function of distributing and totalizing performance data every program

Function of totalizing performance data of specified section in program (2) Performance measurement support system call Interface for delivering performance data to performance measurement support utility 109

Interface for indicating specified section of program from performance measurement support utility 109

First, the performance data distribution/totalization function will be described.

Figure 8:
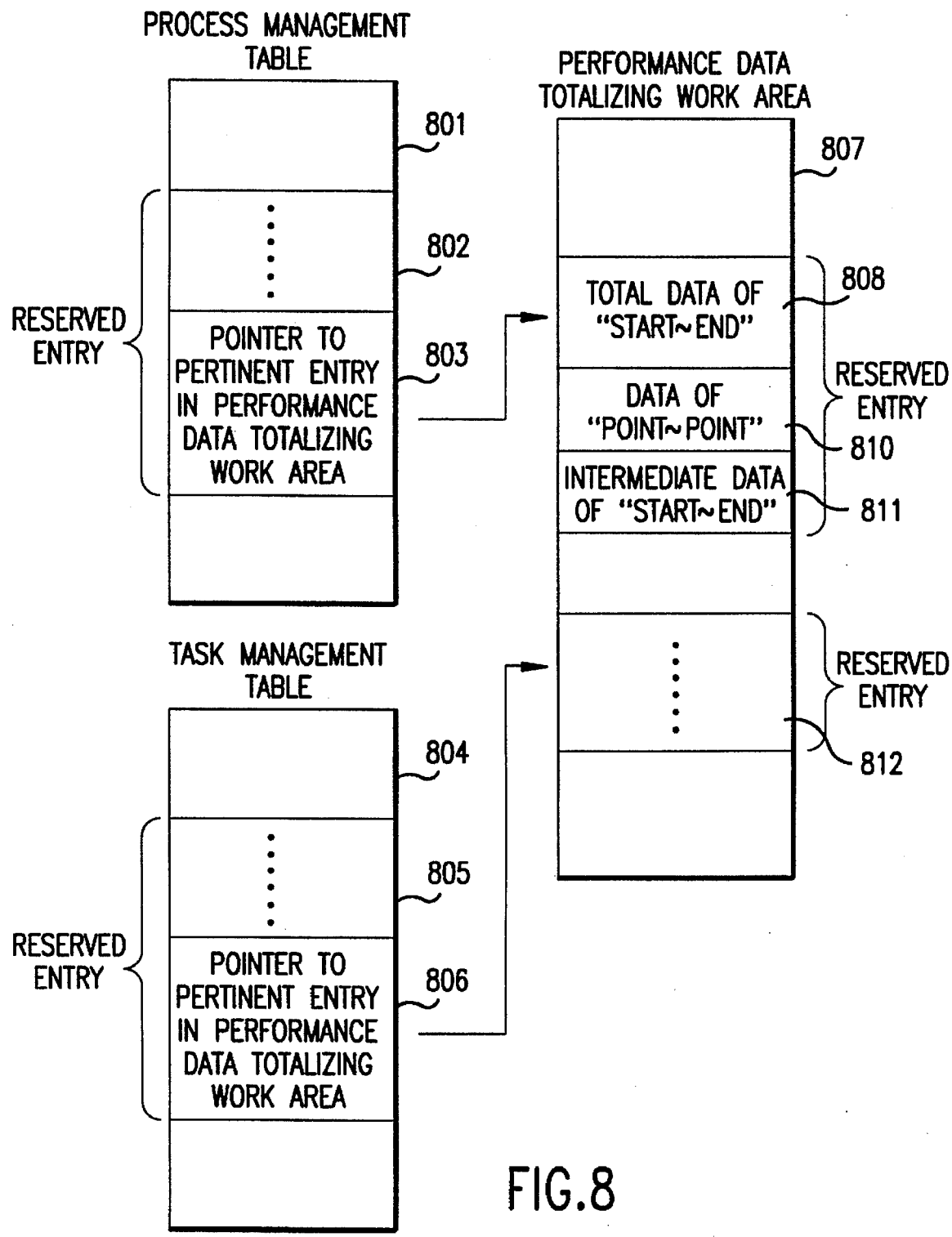
FIG. 8 is a diagram for explaining a process management table, a task management table, and a work area for totalizing performance data.

The processes and tasks are respectively managed by a process management table 801 and a task management table 804 shown in FIG. 8. Each of the process management table 801 and task management table 804 is formed of a plurality of entries, and one entry is allotted to each of the processes or tasks.

Figure 10:
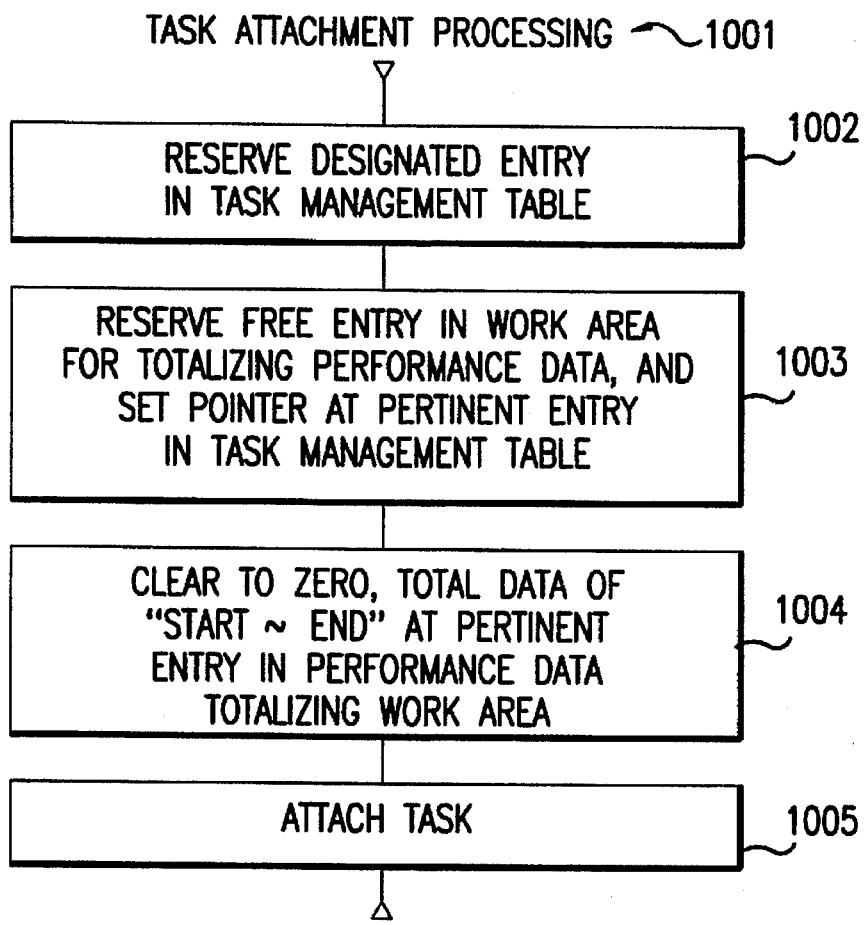
FIG. 10 is a flow chart showing the task attachment processing of the operating system.
Figure 11:
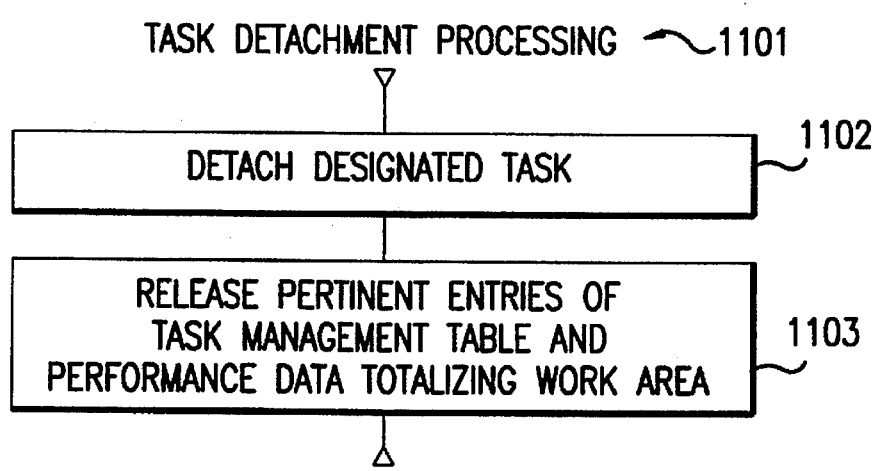
FIG. 11 is a flow chart showing the task detachment processing of the operating system.

Regarding the processes, free entries in the process management table 801 are dynamically allotted at the starts of the processes, and the allotted entries are released at the ends thereof. On the other hand, regarding the tasks, the entries of the task management table 804 are allotted beforehand (not at the start of the tasks) and are released when they have become unnecessary (not at the end of the tasks) as illustrated in FIGS. 10 and 11.

A performance data totalizing work area 807 is prepared in order that the data read from the performance counters 104 of the hardware 101 may be distributed to the individual processes or tasks. The performance data totalizing work area 807 is also formed of a plurality of entries, which are held in correspondence with the associated entries of the process management table 801 and task management table 804 by pointers 803 and 806, respectively. In addition, each entry of the performance data totalizing work area 807 is composed of total data of "start–end" 808, data of "point—point" 810, and intermediate data of "start–end" 811. The intermediate data of "start–end" 811 serves to store the performance data totalized under the run of the program. The total data of "start–end" 808 serves to store the final performance data obtained from the intermediate data of "start–end" 811 at the end of the program. Besides, the data of "point—point" 810 serves to obtain the performance data of the specified section in the program.

Methods of totalizing the data are determined separately for the processes and the tasks, as follows:

Processes; Since the user starts each process consciously through his/her manual operation in most cases, the performance data are obtained on each occasion of "start–end".

Tasks; Since each task is automatically started in event correspondence by another program during the online transactions, the performance data are obtained on the average in a case where the task has been executed two or more times.

FIG. 9 is a diagram showing the structures of the total data of "start–end" 808 in the performance data totalizing work area 807.

The figure corresponds to the case of totalizing the number of executed steps and the number of executed machine cycles.

The total data of "start–end" 901 for the process are the number of executed steps and the number of executed machine cycles themselves. On the other hand, the total data of "start–end" 902 for the task are the average values of the number of executed steps and the number of executed machine cycles. In the case of the task, the number of times of task ends is also stored.

Figure 7:
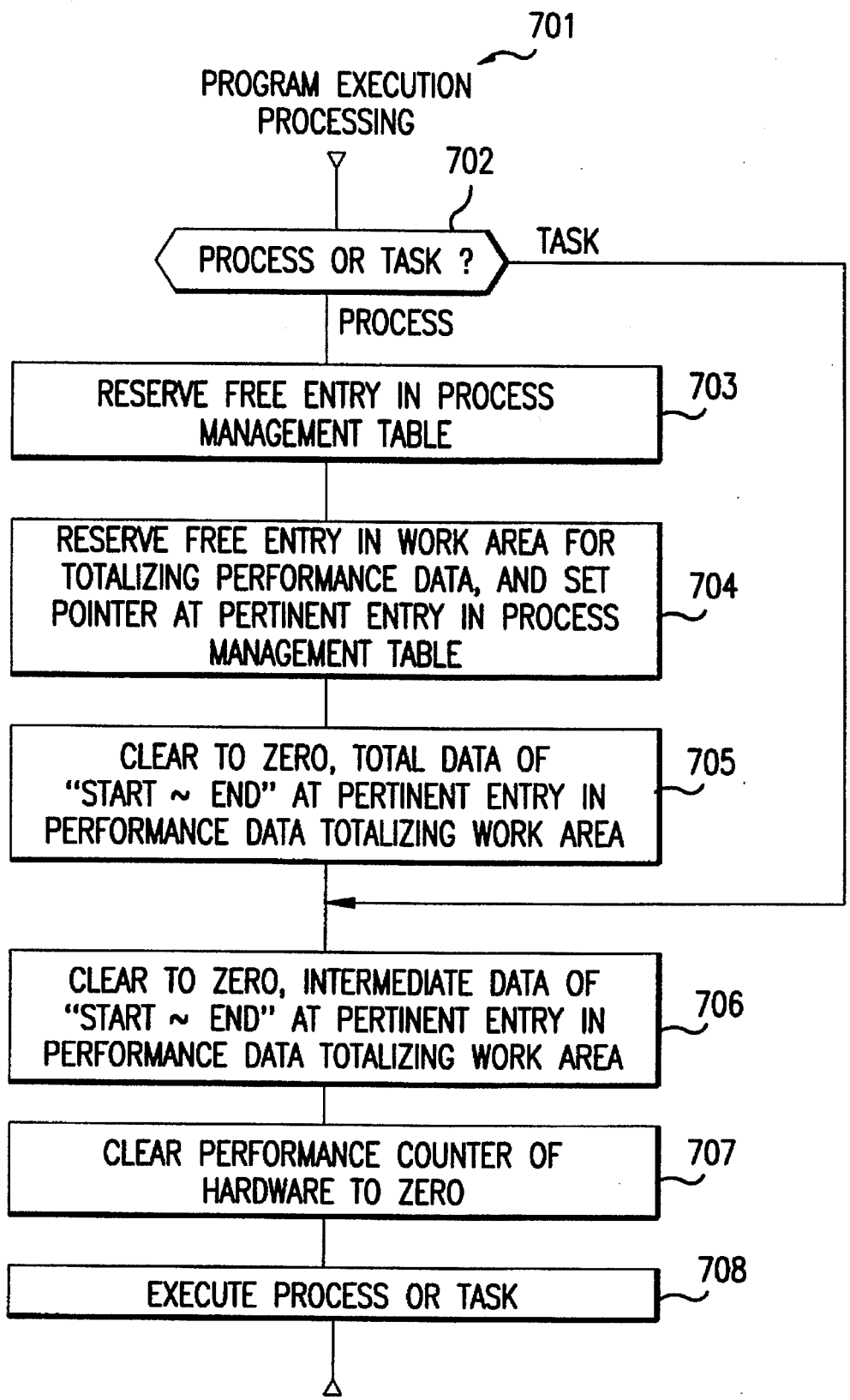
FIG. 7 is a flow chart showing the program execution processing of the operating system.

FIG. 7 illustrates the program execution processing 701 (605 in FIG. 6) of the operating system 105.

Whether the pertinent program is a process or a task, is decided (702). In case of the process, a free entry (802 in FIG. 8) in the process management table 801 is reserved (703). Subsequently, a free entry in the performance data totalizing work area 807 is reserved, and a pointer 803 to the reserved entry is set in the pertinent entry 802 in the process management table 801 (704). Further, the total data of "start–end" 808 of the entry reserved in the performance data totalizing work area 807 is cleared to zero (705). Thereafter, the intermediate data of "start–end" 811 of the entry reserved in the performance data totalizing work area 807 is cleared to zero (706), and the performance counter 104 of the hardware 101 is cleared to zero (707). Finally, the process is started for the execution thereof (708). Meanwhile, in a case where the task has been decided at the step 702, the steps 703, 704 and 705 are not executed. Herein, the intermediate data of "start–end" 811 of a pertinent entry in the performance data totalizing work area 807 is cleared to zero (706), and the performance counter 104 of the hardware 101 is cleared to zero (707). Finally, the task is started for the execution thereof (708).

In the processing 701 of FIG. 7, on condition that the content of the performance measurement validation register 322 is "invalid", the performance measurement is not executed, and hence, the steps 704, 705, 706 and 707 concerning the performance measurement are skipped.

FIGS. 10 and 11 illustrate task attachment (logon)/detachment (logoff) processing items which the operating system 105 executes, respectively. In the case where the program shown in FIG. 6 is a task, the task attachment processing 1001 in FIG. 10 is executed before the start of that processing of the processing items shown in FIG. 6 which is executed by the operating system 105. The task detachment processing 1101 in FIG. 11 is executed after the end of that processing of the processing items shown in FIG. 6 which is executed by the operating system 105.

In the task attachment processing 1001, a designated entry (805 in FIG. 8) is reserved in the task management table 804 (1002). Thereafter, a free entry (812) is reserved in the performance data totalizing work area 807, and a pointer 806 to the reserved entry 812 is set in the pertinent entry 805 in the task management table 804 (1003). Further, the total data of "start–end" 808 of the entry reserved in the performance data totalizing work area 807 is cleared to zero (1004). Finally, the task is attached or logged on (1005). Meanwhile, in the task detachment processing 1101, the designated task is detached or logged off (1102). Subsequently, the pertinent entries of the task management table 804 and performance data totalizing work area 807 are released (1103).

In the processing items of FIGS. 10 and 11, on condition that the content of the performance measurement validation register 322 is "invalid", the performance measurement is not executed, and hence, the steps 1003, 1004 and 1103 concerning the performance measurement are skipped.

Figure 12:
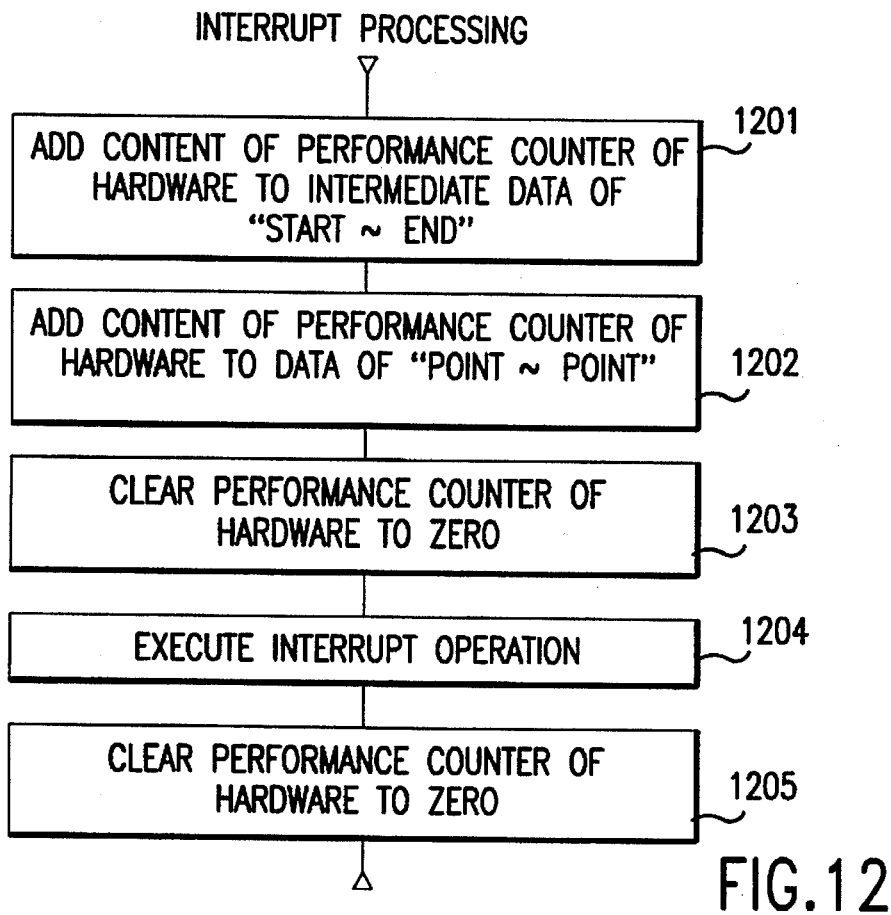
FIG. 12 is a flow chart showing the interrupt processing of the operating system.

FIG. 12 illustrates the interrupt processing (612 in FIG. 6) of the operating system 105. In the interrupt processing, the content of the performance counter 104 of the hardware 101 is added to the intermediate data of "start–end" 811 (1201), the content of the performance counter 104 of the hardware 101 is added to the data of "point—point" 810 (1202), and the content of the performance counter 104 of the hardware 101 is cleared to zero (1203). Subsequently, an interrupt operation is executed (1204). Finally, the content of the performance counter 104 of the hardware 101 is cleared to zero again (1205). The final step of zero clear 1205 is intended to remove the interrupt processing from the object of the performance measurement.

In the interrupt processing of FIG. 12, on condition that the content of the performance measurement validation register 322 is "invalid", the performance measurement is not executed, and hence, the steps 1201, 1202, 1203 and 1205 concerning the performance measurement are skipped.

Figure 13:
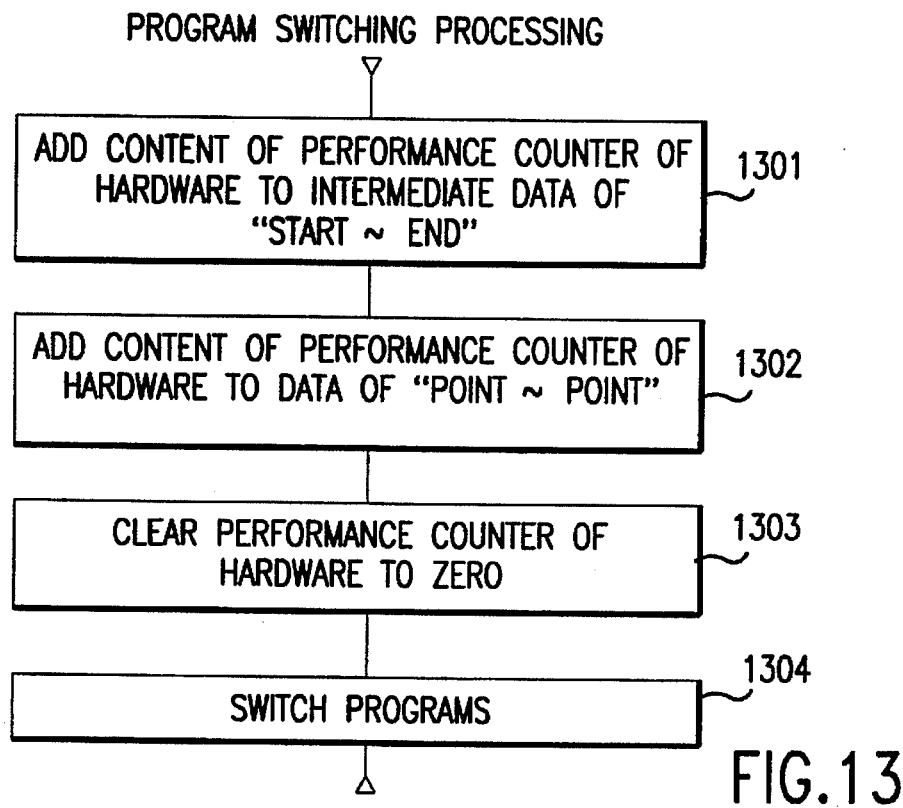
FIG. 13 is a flow chart showing the program switching processing of the operating system.

FIG. 13 illustrates the program switching processing (615 or 618 in FIG. 6) of the operating system 105. In the program switching processing, steps 1301, 1302 and 1303 are executed before the programs are switched (1304). More specifically, the content of the performance counter 104 of the hardware 101 is added to the intermediate data of "start–end" 811 (1301), the content of the performance counter 104 of the hardware 101 is added to the data of "point—point" 810 (1302), and the content of the performance counter 104 of the hardware 101 is cleared to zero (1303).

Thus, the data read from the performance counters 104 of the hardware 101 can be distributed among the individual programs.

In a case where the performance measurement support utility 109 is to obtain performance data in compliance with the operation of the user, an entered command is created as a process, and the end of the process is waited for. On this occasion, the performance measurement support utility 109 serves as a parent process, and the program (process) to be measured becomes a child process.

Processing which delivers the performance data to a system call waiting for the end of the child process, is incorporated in order that the performance data totalized for the process to be measured may be delivered to the performance measurement support utility 109.

In the program switching processing of FIG. 13, on condition that the content of the performance measurement validation register 322 is "invalid", the performance measurement is not executed, and hence, the steps 1301, 1302 and 1303 concerning the performance measurement are skipped.

Figure 14:
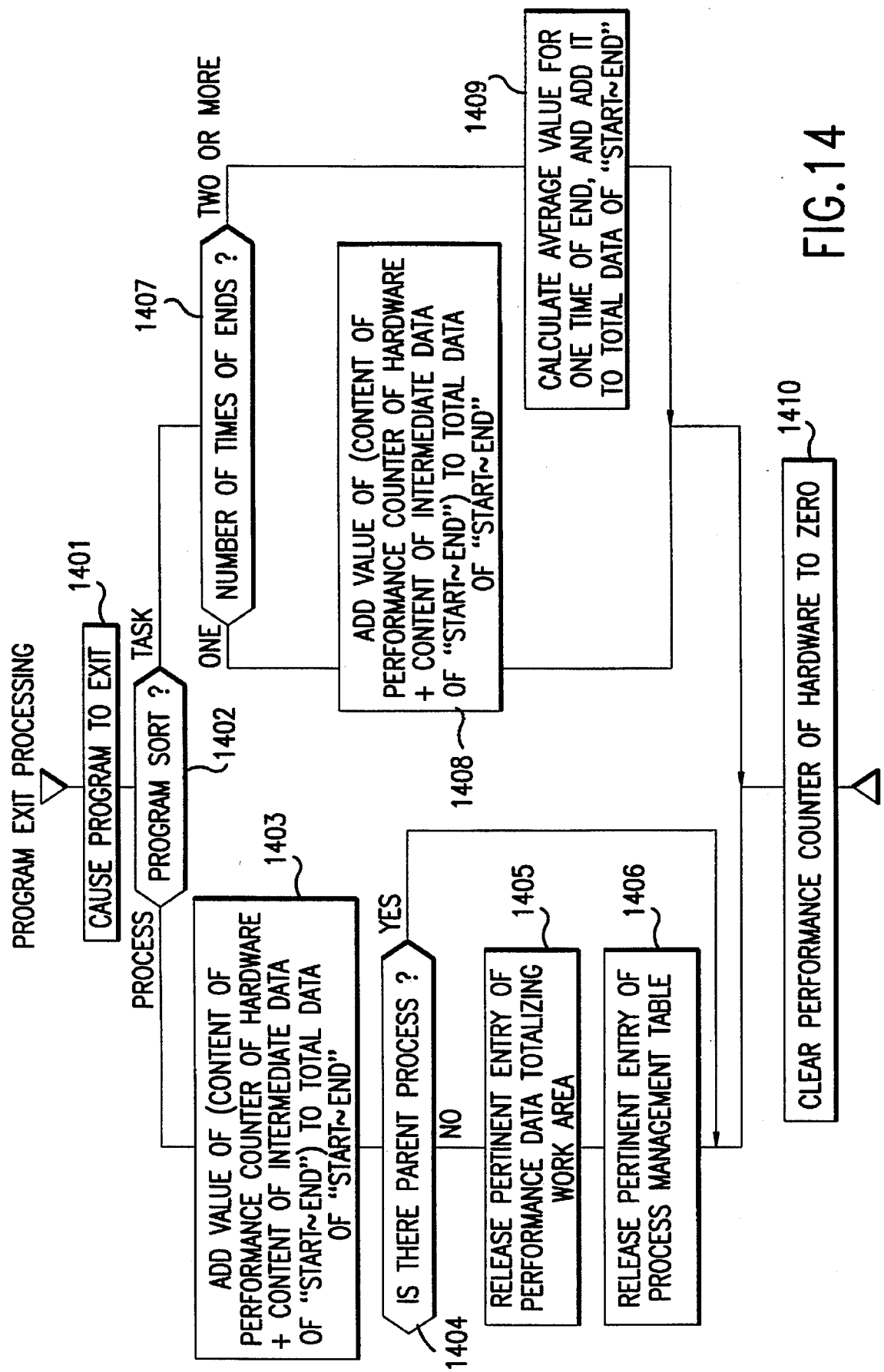
FIG. 14 is a flow chart showing the program exit processing of the operating system.

FIG. 14 illustrates the program exit processing (621 in FIG. 6) of the operating system 105. After the program has been caused to exit (1401), the sort of the program is decided (1402).

In the case where the program is the process, the value of (the content of the performance counter 104 of the hardware 101 + the content of the intermediate data of "start–end" 811) is added to the total data of "start–end" 808 (1403), thereby totalizing the performance data of the process since the start till the end thereof. Subsequently, the presence or absence of the parent process (the performance measurement support utility 109) is decided (1404). In the absence of the parent process, it is judged that the performance data is unnecessary. Consequently, the pertinent entry of the performance data totalizing work area 807 is released (1405), and the pertinent entry of the process management table 801 is released (1406). On the other hand, in the case where the program is the task, the number of times of the ends of the task is decided (1407). Subject to the first end of the task, the value of (the content of the performance counter 104 of the hardware 101 + the content of the intermediate data of "start–end" 811) is added to the total data of "start–end" 808 (1408). In contrast, when the number of times of the task ends is two or more, the average value of the performance data for one time of task end is calculated and is added to the total data of "start–end" 808 (1409). Following the step 1406, 1408 or 1409, the performance counter 104 of the hardware 101 is cleared to zero (1410).

In the program exit processing of FIG. 14, on condition that the content of the performance measurement validation register 322 is "invalid", the performance measurement is not executed, and hence, the steps 1403, 1404, 1405, 1407, 1408, 1409 and 1410 concerning the performance measurement are skipped.

There will now be explained the processing which is executed along with the processing shown in FIG. 6 (or processing shown in FIG. 24) in the case where the performance data of the program is displayed after the end of the program is waited for.

Figure 15:
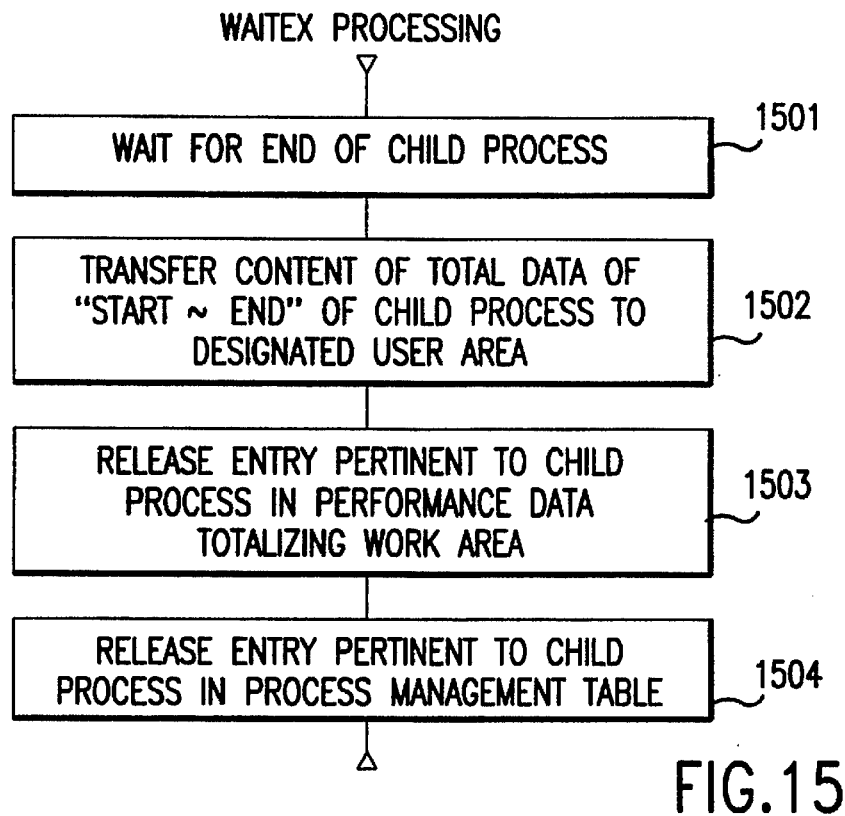
FIG. 15 is a flow chart showing the "waitex" (exit wait) processing of the operating system.

FIG. 15 illustrates the exit wait processing (which shall be termed "waitex" system call) of the operating system 105. The "waitex" system call is issued by the performance measurement support utility 109.

In the "waitex" system call, the end of the child process (the process to-be-measured) is first waited for (1501). When the child process has ended, the content of the total data of "start–end" 808 of the child process is transferred to a designated user area (1502). Thus, the performance data of the process to-be-measured is delivered to the performance measurement support utility 109. Subsequently, the entry of the performance data totalizing work area 807 pertinent to the child process is released (1503), and the entry of the process management table 801 pertinent to the child process is released (1504).

Next, the performance measurement support system call will be elucidated.

As stated before, the performance measurement support system call includes the interface for delivering the performance data to the side of the performance measurement support utility 109, and the interface for accepting the performance data of the specified section of the program as indicated from the side of the performance measurement support utility 109.

The interface for delivering the performance data to the performance measurement support utility 109 has been partially explained in the "waitex" processing of the operating system 105 shown in FIG. 15. In the case of FIG. 15, however, the performance data is accepted at the end of the program (process). The system call interface for accepting the performance data amidst the run of the program, not at the end of the program, is the performance data acceptance processing of the operating system 105 illustrated in FIG. 16.

Figure 16:
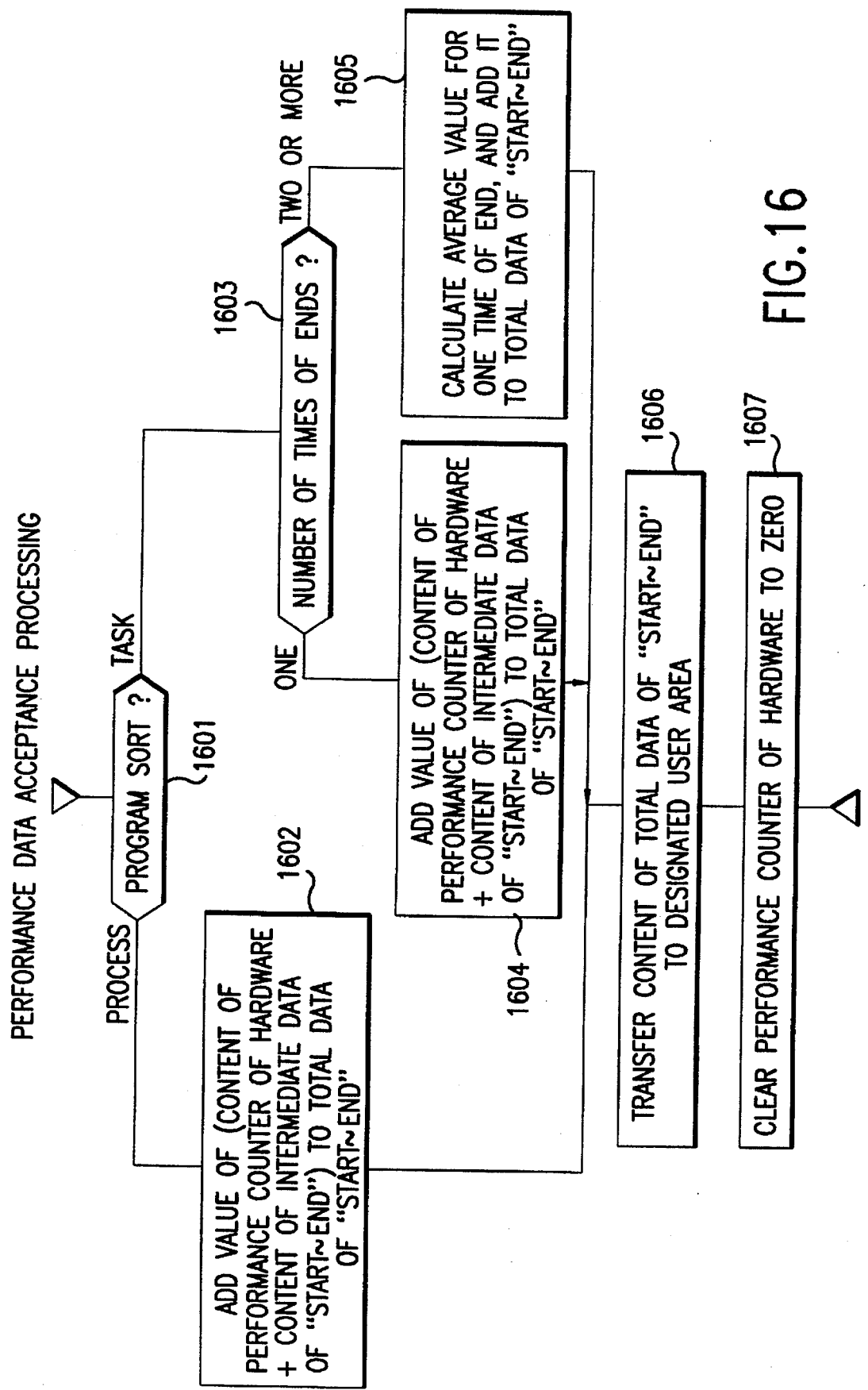
FIG. 16 is a flow chart showing the performance data acceptance processing of the operating system.

The processing of FIG. 16 consists in that the totalization of the performance data in the program exit processing (FIG. 14) of the operating system 105 is permitted to be done even under the run of the program. This processing is utilized by the step 2003 shown in FIG. 20.

In the performance data acceptance processing, the sort of the program is first decided (1601).

In the case where the program is the process, the value of (the content of the performance counter 104 of the hardware 101 + the content of the intermediate data of "start–end" 811) is added to the total data of "start–end" 808 (1602), thereby totalizing the performance data of the process since the start thereof till the current time.

On the other hand, in the case where the program is the task, the number of times of the ends of the task is decided (1603). Subject to the first end of the task, the value of (the content of the performance counter 104 of the hardware 101 + the content of the intermediate data of "start–end" 811) is added to the total data of "start–end" 808 (1604). In contrast, when the number of times of the task ends is two or more, the average value of the performance data for one time of task end is calculated and is added to the total data of "start–end" 808 (1605). Following the step 1602, 1604 or 1605, the content of the total data of "start–end" 808 is transferred to a designated user area (1606). Finally, the performance counter 104 of the hardware 101 is cleared to zero (1607).

Figure 17:
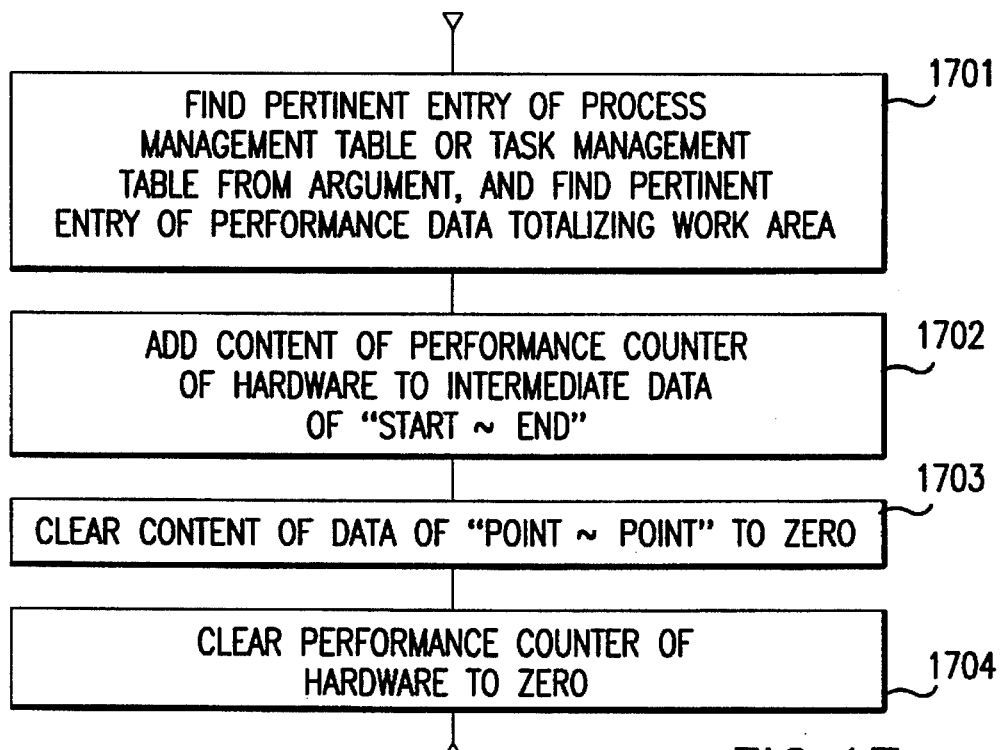
FIG. 17 is a flow chart showing a system call for starting the sectional performance measurement of the operating system.
Figure 18:
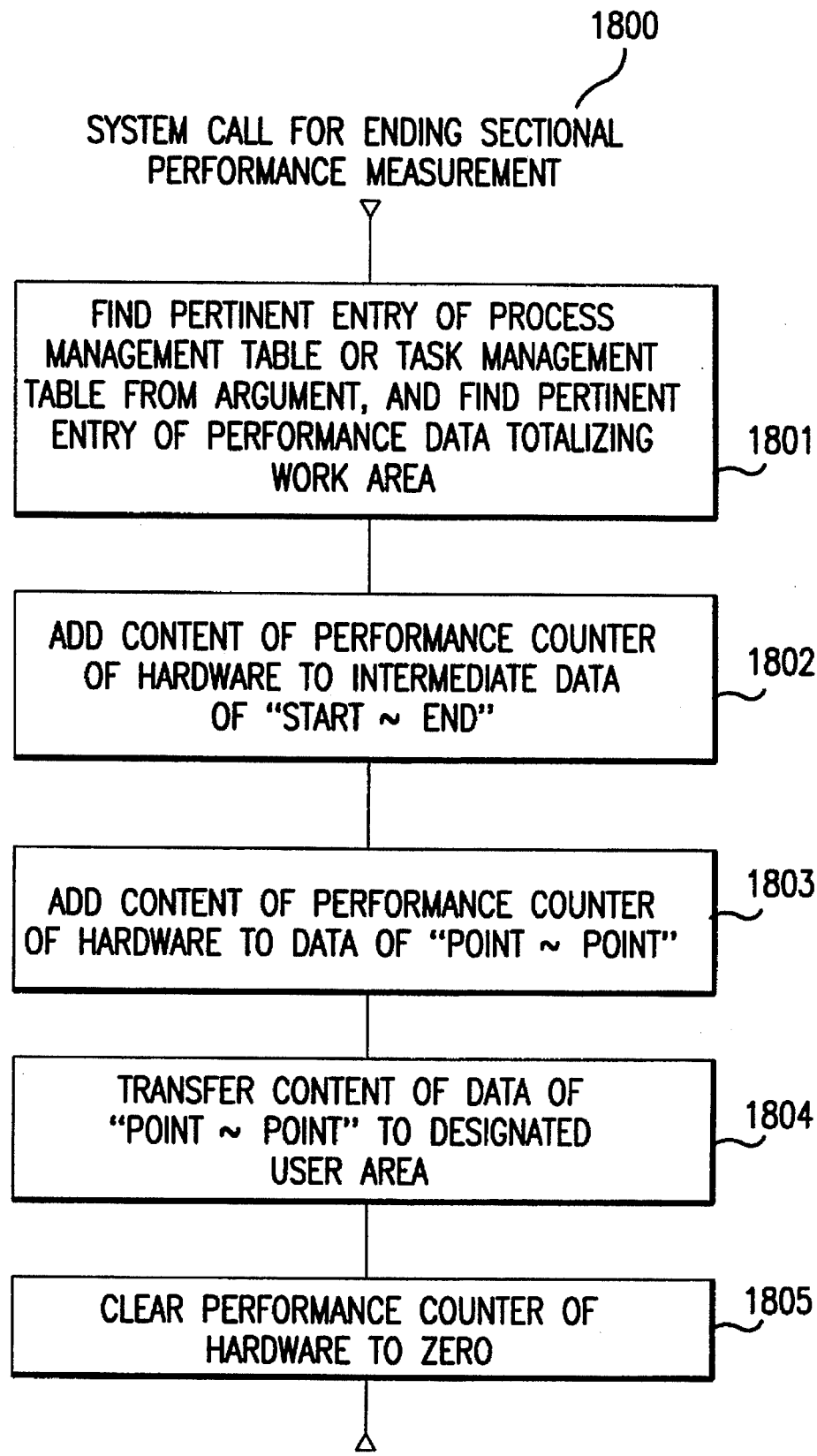
FIG. 18 is a flow chart showing a system call for ending the sectional performance measurement of the operating system.
Figure 27:
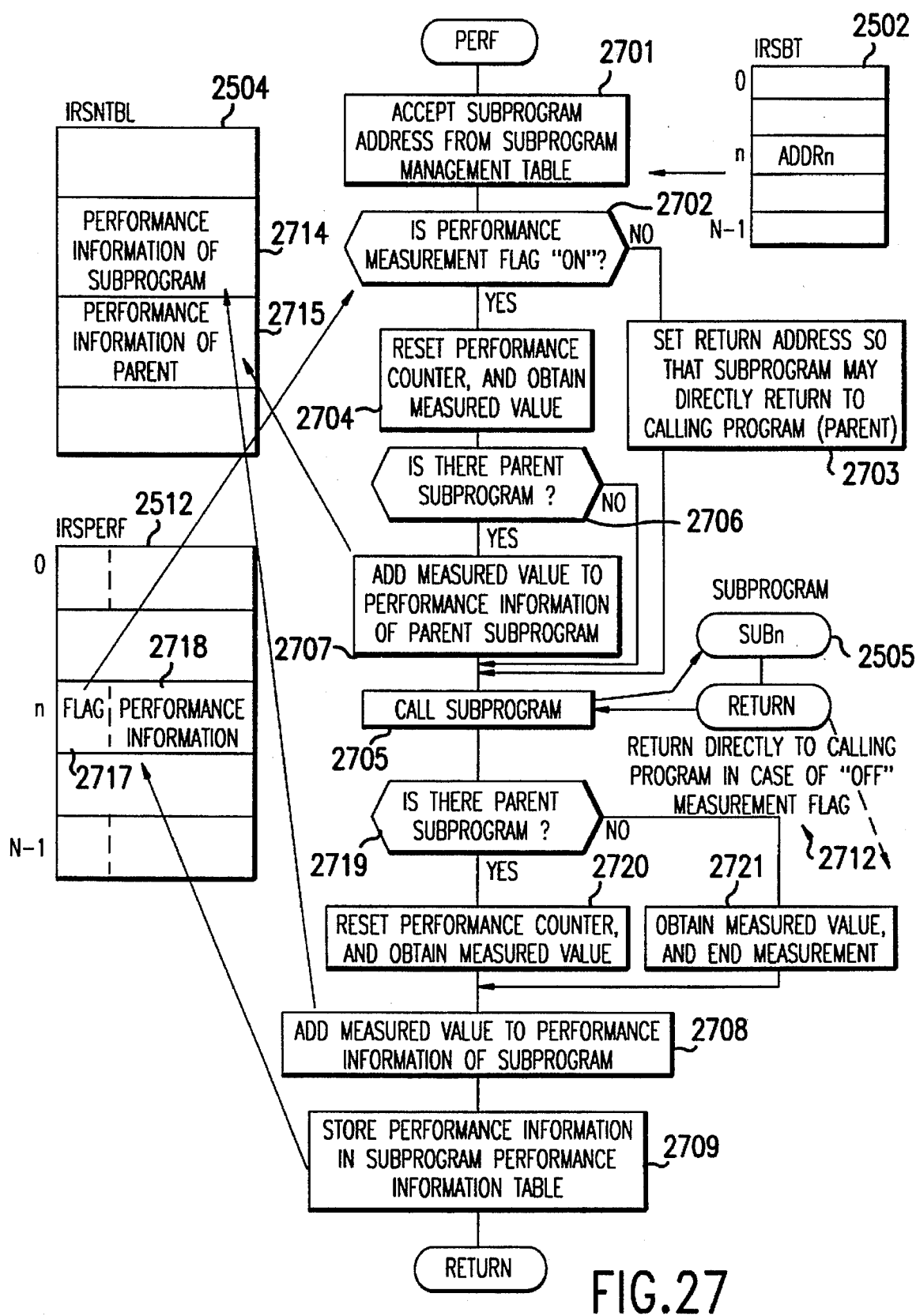
FIG. 27 is a flow chart showing the processing of the subprogram performance measurement facility in detail.

FIGS. 17 and 18 illustrate the system calls of an interface for accepting the performance data in accordance with the indication of the specified section in the program, respectively (the system call in FIG. 17 is utilized at steps 2704 and 2720 in FIG. 27, while the system call in FIG. 18 is utilized at a step 2721 in FIG. 27). The performance data of the specified section is accepted through the system call 1700 instructive of the start of the performance measurement and the system call 1800 instructive of the end of the performance measurement. The performance data is returned to the system call 1800 instructive of the performance measurement end. Which of the programs is set as the object to-be-measured, is designated as the argument of the system calls 1700 and 1800.

In the sectional performance measurement starting system call 1700, the pertinent entry of the process management table 801 or task management table 804 is found from the given argument, and the pertinent entry of the performance data totalizing work area 807 is found (1701). Subsequently, the content of the performance counter 104 of the hardware 101 is added to the intermediate data of "start–end" 811 (1702). Further, the content of the data of "point—point" 810 is cleared to zero (1703), and the performance counter 104 of the hardware 101 is cleared to zero (1704), thereby effecting initialization for the totalization of the performance data of the program section.

On the other hand, in the sectional performance measurement ending system call 1800, the pertinent entry of the process management table 801 or task management table 804 is found from the given argument, and the pertinent entry of the performance data totalizing work area 807 is found (1801). Subsequently, the content of the performance counter 104 of the hardware 101 is added to the intermediate data of "start–end" 811 (1802), and the content of the performance counter 104 of the hardware 101 is added to the data of "point—point" 810 (1803), thereby totalizing the performance data up to the current time. Further, the content of the data of "point—point" 810 is transferred to a designated user area (1804), and the performance counter 104 of the hardware 101 is cleared to zero (1805).

As illustrated in FIG. 1, the performance measurement support utility 109 is configured of the performance measurement mode setting facility 110, performance information edit and display facility 111 and subprogram performance measurement facility 112.

The performance measurement mode setting facility 110 and the performance information edit and display facility 111 are so related that the former facility 110 is started by the user at the time point of the start of the performance measurement (step 2103, 2207 or 2304 in FIG. 21, FIG. 22 or FIG. 23), while the latter facility 111 is started by the user at the time point of the start of a performance information display (step 2104, 2208 or 2305). The process is started by the user at the time point of a start 2101 shown in FIG. 21. The task is started by the computer system at the time points of a start 2214, etc. shown in FIG. 22. The subprogram is started by the computer system at the time points of a start 2322, etc. shown in FIG. 23.

Figure 25:
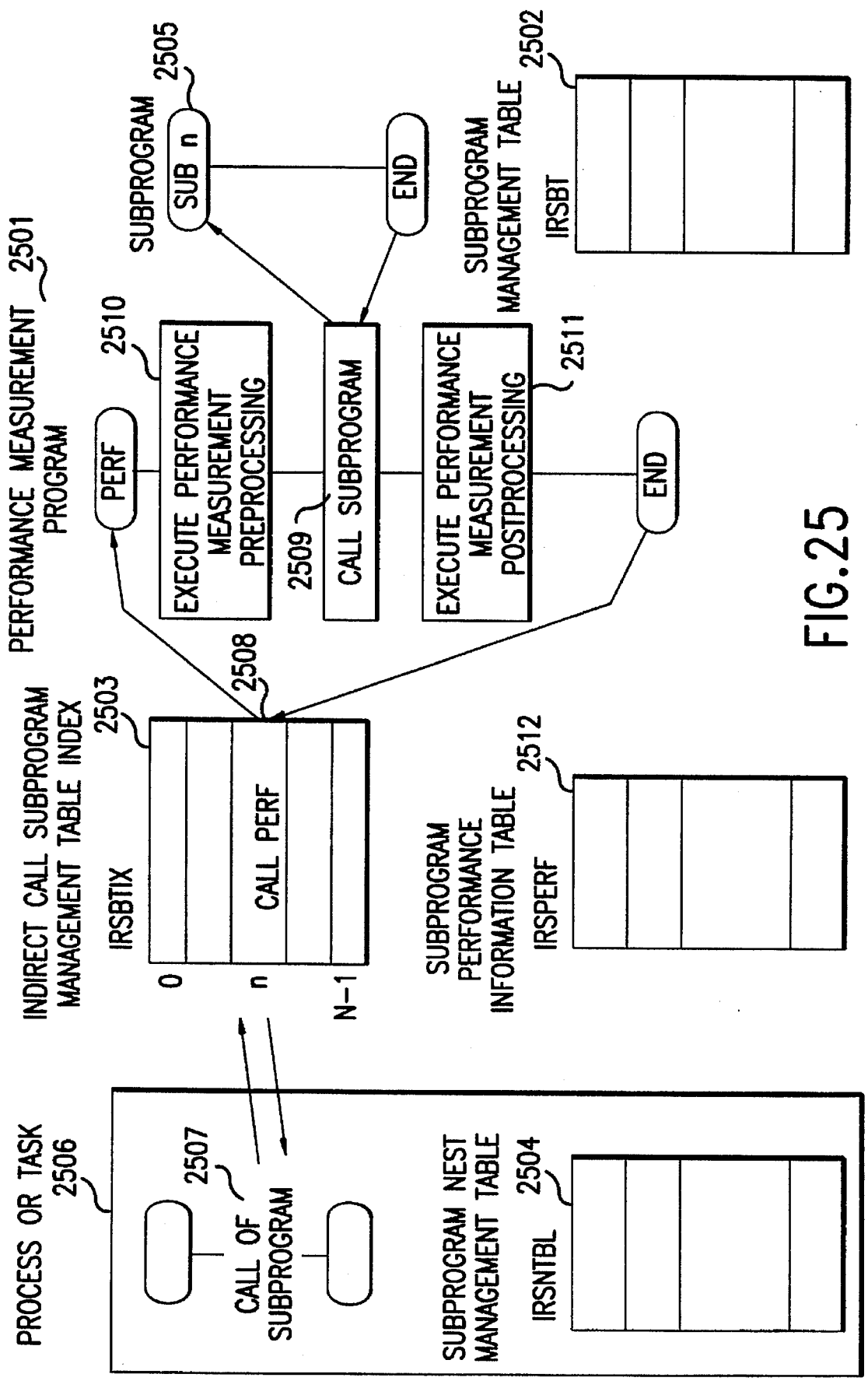
FIG. 25 is a flow chart showing the processing of a subprogram performance measurement facility.

FIG. 19 illustrates the performance measurement mode setting facility 110. The illustrated processing interprets the measurement mode designated by the user as indicated in Table 1 (1901) and issues the system call (501 in FIG. 5) to the operating system 105, thereby starting the performance measurement in the designated measurement mode (1904). In starting the performance measurement (1902), a Subprogram performance information table IRSPERF (Indirect Resident Subprogram PERFormance) 2512 for storing performance information on subprograms as shown in FIG. 25 is initialized (1903). On the other hand, in ending the performance measurement (1902), a command parameter is set in the measurement end mode, and the system call (501 in FIG. 5) is issued, so as to stop the performance measurement functions of the hardware 101 and operating system 105.

Figure 20:
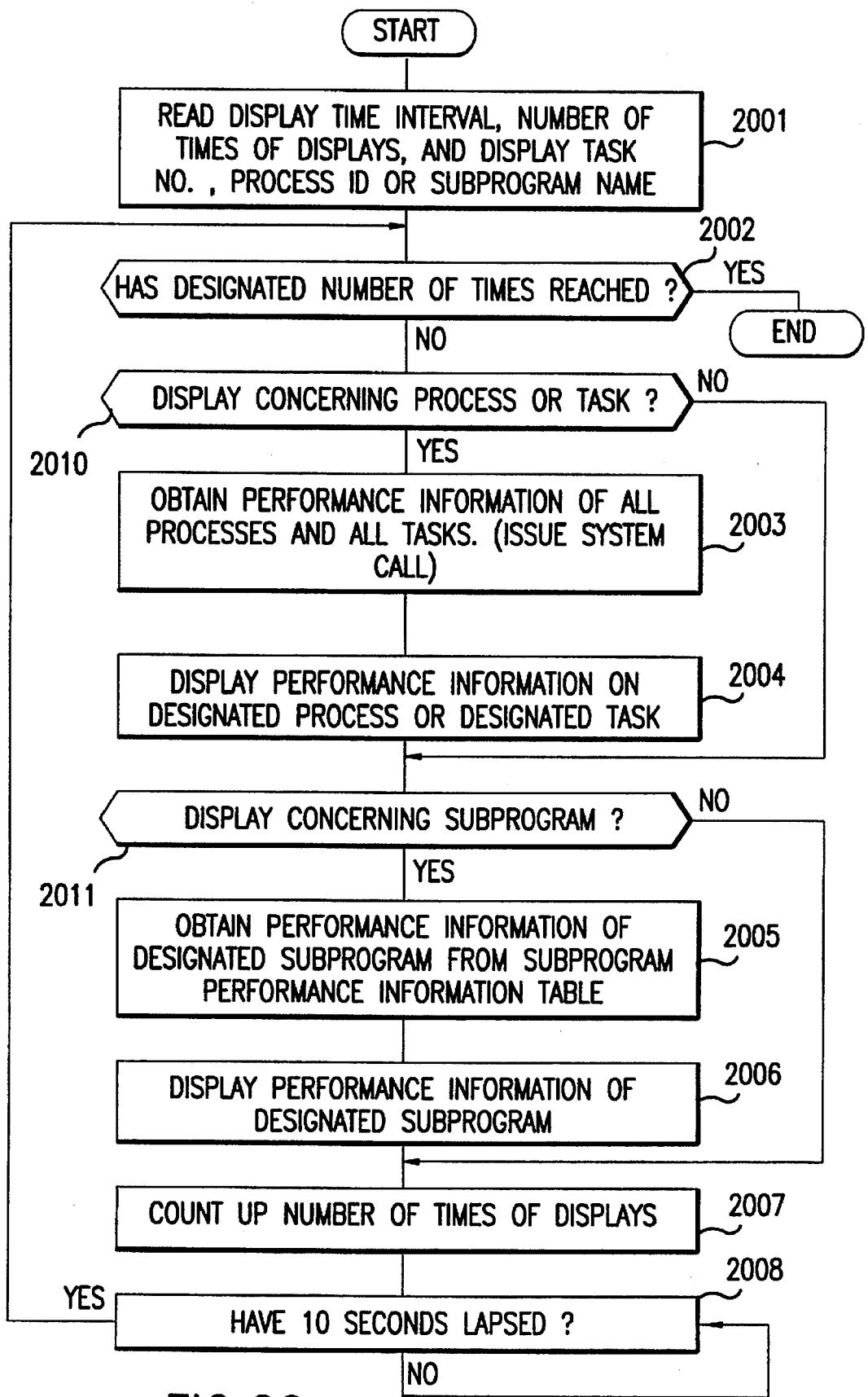
FIG. 20 is a flow chart showing the processing of a performance information edit and display facility.

FIG. 20 illustrates the performance information edit and display facility 111. Assuming the subprogram 117 as the object to-be-measured 115 by way of example, when the subprogram 117 has been called, the performance information edit and display facility 111 checks information indicating if the performance measurement is to be done for the subprogram. When the performance measurement is to be done in view of the information, the performance information edit and display facility 111 causes the performance measurement facility 103 of the hardware 101 to execute the performance measurement, and it delivers or displays the performance information obtained by the performance measurement facility 103, every predetermined time period. The performance information edit and display facility 111 is implemented in the form of commands.

Figure 24:
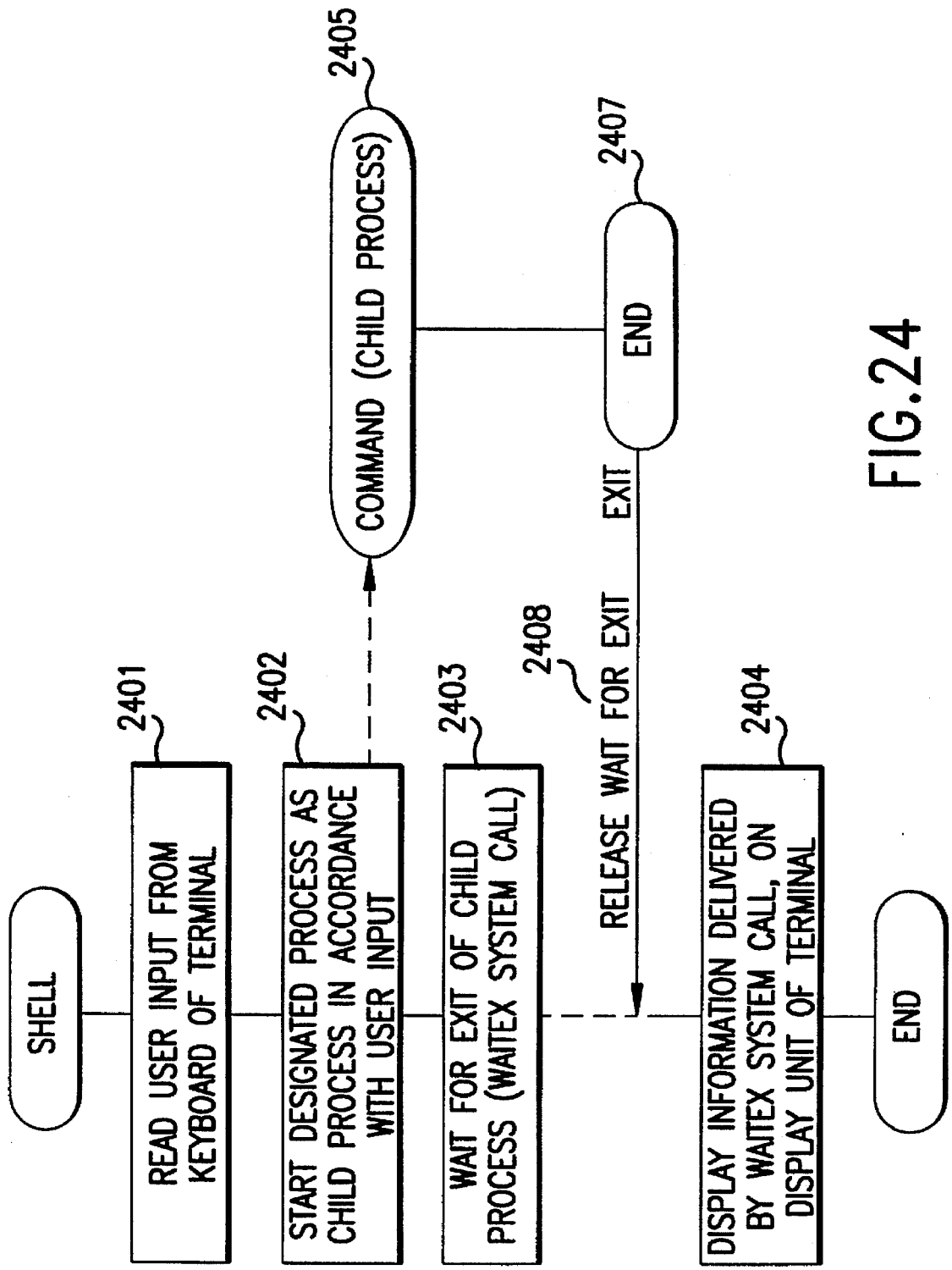
FIG. 24 is a flow chart showing the processing of another performance information edit and display facility.

Incidentally, while the processing shown in FIG. 20 displays the performance information concerning the process/task/subprogram which is being run, another expedient for the performance measurement and the display of the measured result is illustrated in FIG. 24. The expedient shown in FIG. 24 is processing in which the performance information is displayed at the time point of the end of a process on condition that the process is started through a shell being a command interpreter, and which will be described in detail later. Display formats in the case of FIG. 24 are omitted from illustration.

In the processing of FIG. 20, any of the process/task/subprogram is selected for the display operation. In the flow of FIG. 20, accordingly, either (steps 2003+2004) or (steps 2005+2006) is selected and executed. Besides, regarding the step 2004, either of the task and the process is displayed. Concretely, when command parameters are read at a step 2001, they are checked so that only one of the process, task and subprogram can be designated. Therefore, both the process and the task are not displayed at the step 2004 at which the designated process or task is to be displayed.

By the way, a plurality of measured results can be displayed as to each of the process, task and subprogram. The results are displayed in time series on one image.

Using the function of the operating system (OS) 105, the performance information items can also be output to files without displaying them on a display screen. In the case of utilizing this function, the display screen is not occupied, and hence, the performance information items of the process, task and subprogram can be simultaneously measured by concurrently executing a plurality of processing items as shown in FIG. 20. Incidentally, identification information expressing which of the information items of the process, task and subprogram is being output is delivered along with the performance information in the display operation as well as the file output operation.

Referring to FIG. 20, first of all, the performance information edit and display facility 111 reads a display time interval, the number of times of displays, and the No. of a task, the ID (identifier) of a process or the name of a subprogram to-be-displayed which have been designated as the command parameters (2001). If the display operation concerns the process or task, is decided at a step 2010. Further, the system call is issued so as to execute the processing shown in FIG. 16, thereby obtaining the performance information items of all the processes and all the tasks (2003). Subsequently, only the performance information of the designated process or task is edited into the display format and then displayed (2004). When the display operation concerns neither the process nor the task (2010), the steps 2003 and 2004 are skipped. If the display operation concerns the subprogram, is decided at a step 2011. As to the designated subprogram, the performance information is read from the subprogram performance information table IRSPERF 2512 (2005), and it is edited into the display format and is displayed (2006). When the display operation does not concern the subprogram (2011), the steps 2005 and 2006 are skipped. Further, the number of times of displays is counted up (2007). If the designated display time interval of, for example, 10 [sec.] has lapsed, is decided (2008). When the display time interval has not lapsed, the lapse is waited for, and when the interval has lapsed, the processing proceeds to a step 2002. The pertinent steps subsequent to the step 2001 are iterated the designated number of times of displays at the designated time intervals (2002).

Figure 21:
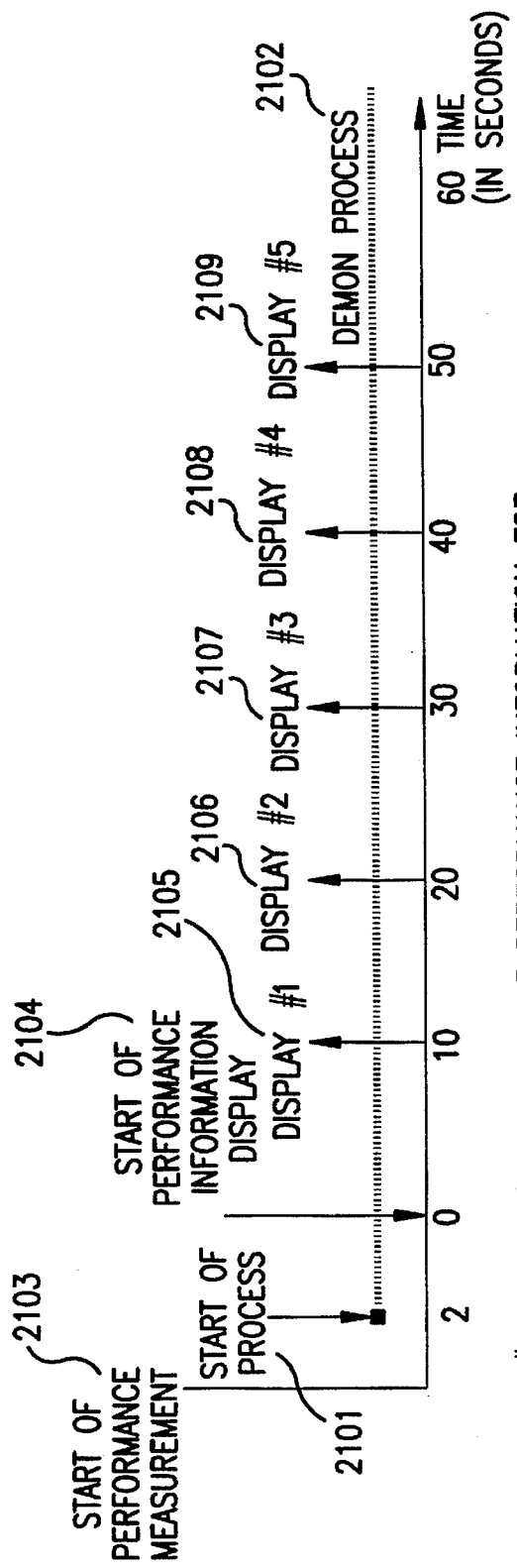
FIG. 21 is a diagram for explaining the display operation of the performance information of a process.

FIG. 21 illustrates the method of displaying the performance information on the process. An example shown here is such that the performance information is displayed every 10 [sec.] in relation to a demon process 2102 which continues to run since the start 2101 thereof. In compliance with the user's instruction for starting the performance measurement (2103), the operating system 105 starts the performance measurement. In this state, the user gives the instruction for starting the performance information display operation (2104). At the first display 2105, the integral value of the performance information measured since the process start time point 2101 till the corresponding display time point (to the display 2105) is displayed. Thenceforth (at each of display #2 (2106), display #3 (2107), display #4 (2108) and display #5 (2109)), the differential value of the performance information measured since the last display time point till the corresponding display time point is displayed. It is based on the step 1607 in FIG. 16 that the performance counter 104 is reset every time period of 10 [sec.]. By way of example, at the display #5 (2109), the performance information is displayed in terms of the differential value obtained since the time point of the display #4 (2108) being the last display time point.

FIG. 22 illustrates the method of displaying the performance information on the task. An example shown here is such that the performance information of the task is displayed at display time intervals of 10 [sec.] in a case where the task is iteratively executed three times (2204, 2205 and 2206), one time of task execution 2203 extending from a start 2201 to an end 2202. In compliance with the user's instruction for starting the performance measurement (2207), the operating system 105 starts the performance measurement.

In this state, the user gives the instruction for starting the performance information display operation (2208). Then, in a case where the execution of the task has not ended at a display time point (display #1 (2209)), the value of the performance information measured since the task start time point (at the start 2214) till the corresponding display time point (to the display #1 2209) is displayed. Regarding each of displays (display #2 (2210), display #3 (2211), display #4 (2212) and display #5 (2213)) after the first task execution 2204, the performance information of the task execution having already ended or the average value of the performance information of such task executions is displayed. Concretely, the performance information measured in the first task execution 2204 is displayed at each of the display #2 (2210) and display #3 (2211), while the average value of the performance information measured in the first task execution 2204 and second task execution 2205 is displayed at each of the display #4 (2212) and display #5 (2213).

Figure 23:
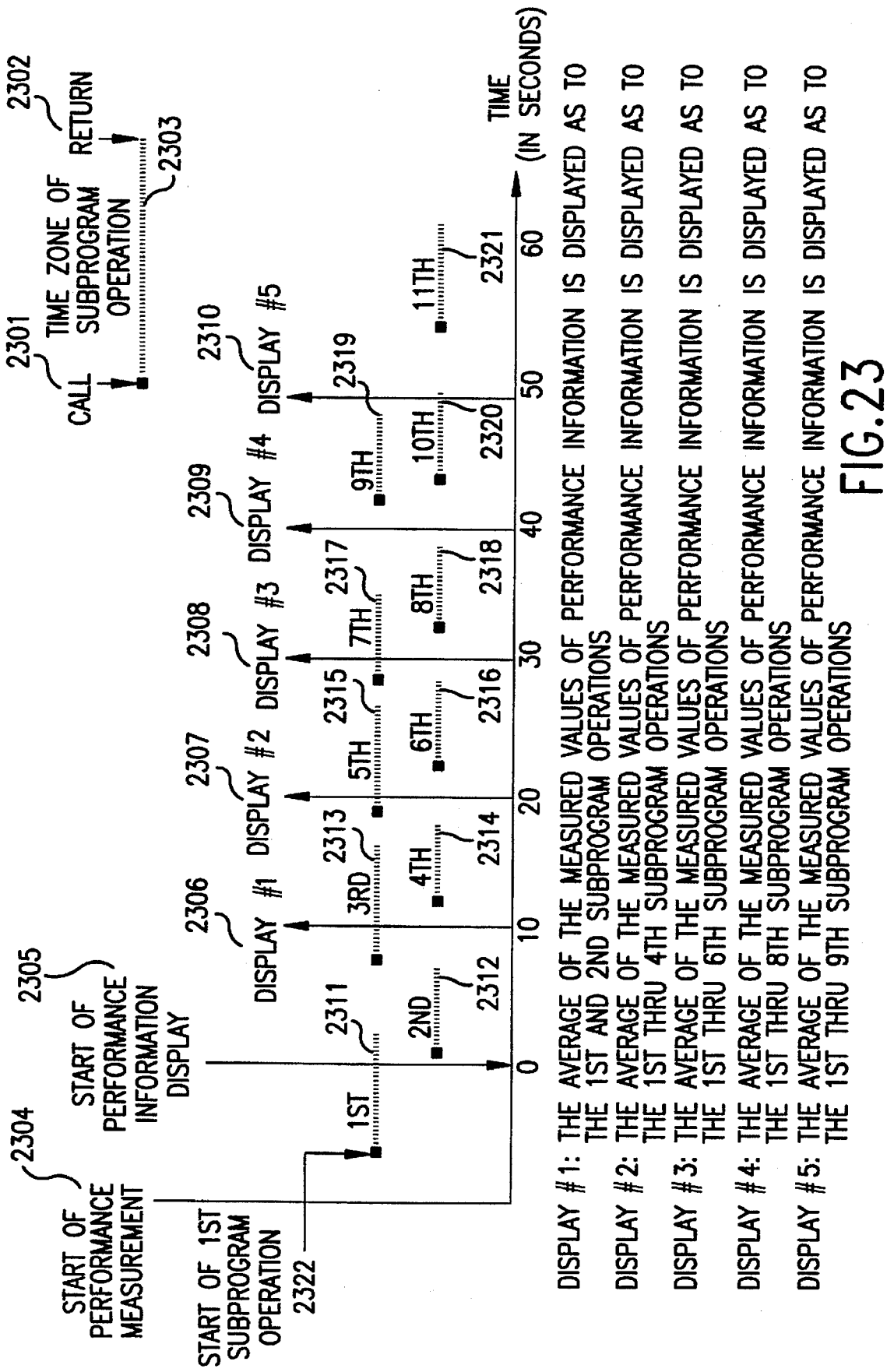
FIG. 23 is a diagram for explaining the display operation of the performance information of a subprogram.

FIG. 23 illustrates the method of displaying the performance information on the subprogram. An example shown here is such that the performance information of the subprogram which is iteratively called and executed is displayed at display time intervals of 10 [sec.], one time of subprogram execution 2303 extending from a call 2301 to a return 2302. In compliance with the user's instruction for starting the performance measurement (2304), the operating system 105 and the subprogram performance measurement facility 112 start the performance measurement. In this state, the user gives the instruction for starting the performance information display operation (2305). Then, at the first display 2306, there is displayed the average of values measured for the subprogram executions (the first execution 2311 and second execution 2312) having already ended at the corresponding time point (to the first display 2306). Thenceforth, there is displayed the average of values measured for the subprogram executions having ended at or before the corresponding display time point after the last display. By way of example, the average of the performance information values measured in the first–fourth executions (2311–2314) is displayed at display #2 (2307), while the average of the performance information values measured in the first–ninth executions (2311–2319) is displayed at display #5 (2310).

FIG. 24 illustrates the method of editing and outputting the performance information by the use of the shell which is the command interpreter. When the shell is utilized for the performance measurement, the performance data is displayed after the end of the program unlike the display under the run of the program in FIGS. 21, 22 and 23.

The shell reads an input given by the user, from the keyboard of a terminal (2401), and it starts a process designated in accordance with the user input, as a child process 2405 (2402). Thereafter, the shell waits for the exit of the started child process 2405 by the use of the "waitex" system call (2403). When the execution of the child process 2405 has ended (2407), the wait based on the "waitex" system call is released (2408). The performance information of the child process 2405 is recorded by the operating system 105, and is returned as the output of the "waitex" system call. Therefore, the information delivered by the "waitex" system call is displayed on the display unit of the terminal (2404).

FIG. 25 illustrates the subprogram performance measurement facility 112 which is subprogram performance measurement means. In the performance measurement of the subprogram which is called by either the process or the task, the subprogram is called through a performance measurement program 2501, which finds performance information items presented before and after the run of the subprogram, thereby obtaining the performance information for one time of subprogram call. The subprogram performance measurement facility 112 includes the subprogram performance information table IRSPERF 2512 which forms first and second memory means.

In view of FIG. 25, it seems that the subprogram performance measurement facility 112 shown in the figure operates even when the performance measurement is not executed. As will be explained with reference to FIG. 27 showing the details of the performance measurement program 2501 in FIG. 25, however, unnecessary processing is skipped owing to steps 2702 and 2703 in FIG. 27 when the performance measurement is not to be executed.

As illustrated in FIG. 26, subprograms are managed by a subprogram management table IRSBT (Indirect Resident SuBprogram Table) 2502 in which serial Nos. are afforded to the combinations of subprogram names and addresses. The subprogram of No. n, subprogram name SUBn and address ADDRn shall be supposed here.

Referring back to FIG. 25, the subprogram performance measurement facility 112 includes the performance measurement program PERF (PERFormance) 2501 which is a subprogram for measuring the performance of the subprogram of No. n, the subprogram management table IRSBT 2502 in which the addresses of the subprograms are stored in correspondence with the Nos. thereof, indirect call subprogram management table indexes IRSBTIX (Indirect Resident SuBprogram Table IndeXes) 2503 which serve for indirect calls, and a subprogram nest management table IRSNTBL (Indirect Resident Subprogram Nest TaBLe) 2504 in which the performance information items of all the subprograms to be called by the processes or tasks are stored. The tables IRSBT 2502 and IRSBTIX 2503 are created when the subprograms have been attached or logged on.

At the point of time 2507 at which the subprogram SUBn 2505 is to be called, the process or task 2506 to call the subprogram SUBn 2505 does not call the subprogram SUBn 2505 itself, but it calls the index n of the table IRSBTIX 2503 corresponding to the subprogram SUBn 2505. An instruction for calling the performance measurement program PERF 2501 (call instruction "CALL PERF 2508") is stored in the table IRSBTIX 2503. When the index n of the table IRSBTIX 2503 corresponding to the subprogram SUBn 2505 has been called, the operation of the facility 112 shifts from the table IRSBTIX 2503 to the program PERF 2501. This program PERF 2501 obtains the performance information by executing performance measurement processing items (2510, 2511) before and after calling the subprogram 2505 (2509). Subsequently, it stores the obtained performance information in the tables IRSNTBL 2504 and IRSPERF 2512. The table IRSNTBL 2504 is prepared in order to correctly evaluating performances even when the subprograms are called as a nest, while the table IRSPERF 2512 stores the performance data of each individual subprogram therein. The case where the subprograms are called as the nest, will be explained later with reference to FIG. 28.

FIG. 27 illustrates the detailed processing of the performance measurement program PERF 2501. The program PERF 2501 first accepts the address of the pertinent subprogram stored in the table IRSBT 2502 (2701). The subprogram SUBn 2505 is called on the basis of the address accepted at the step 2701 (2705). The table IRSPERF 2512 contains a flag 2717 for setting whether or not the performance measurement is to be executed. When the flag 2717 is OFF, the performance measurement is not done. The flag 2717 is set at the step 1903 (FIG. 19) for initializing the subprogram performance information table 2512 as is carried out by the performance measurement mode setting facility 110. In the case where the performance measurement is not to be executed, the return address of the subprogram SUBn stored in a stack is set at the address of the calling program (parent) so that the subprogram SUBn after having been run may directly return to the calling program (2712) without returning to the program PERF 2501 (2703). On the other hand, in the case where the performance measurement is to be executed, the performance counter 104 is reset, and the measured value of the performance information is simultaneously obtained (2704). In the presence of a parent subprogram, the measured value on this occasion is the performance data obtained since the time point of the pertinent processing (2704) of the program PERF 2501 which is calling the parent subprogram. In the presence of the parent subprogram (2706), accordingly, the measured value is added to the performance information of the parent subprogram in the table IRSNTBL 2504 (2707). Upon returning from the subprogram 2505, the program PERF 2501 decides whether or not the parent subprogram exists (2719). In a case where the parent subprogram exists, the performance counter 104 is reset, and the measured value of the performance information at that time is obtained (2720). In contrast, in a case where the parent subprogram does not exist, the measured value is obtained, and the measurement is ended (2721). In either case, the performance data is to be measured since the performance counter reset processing issued last. Subsequently, the measured value is added to the performance information of the subprogram SUBn in the table IRSNTBL 2504 (2708). Besides, the measured performance information is stored in the table IRSPERF 2512 (2709). The performance information stored in the table IRSPERF 2512 is the data of each subprogram, and the performance information display is effected on the basis of the data (2006 in FIG. 20). On the other hand, the performance information stored in the table IRSNTBL 2504 is utilized for correctly evaluating the performances of the individual subprograms even when the subprograms are called as the nest. This will be explained later.

In the program PERF 2501, the performance is measured by the use of the facility of the operating system 105 for accepting the performance information of the specified section ("point—point"). Each of the steps of resetting the counter and obtaining the measured value (2704, 2720) is effected by the sectional performance measurement starting system call 1700 (shown in FIG. 17), while the step of obtaining the measured value and ending the measurement (2721) is effected by the sectional performance measurement ending system call 1800 (shown in FIG. 18).

Figure 28:
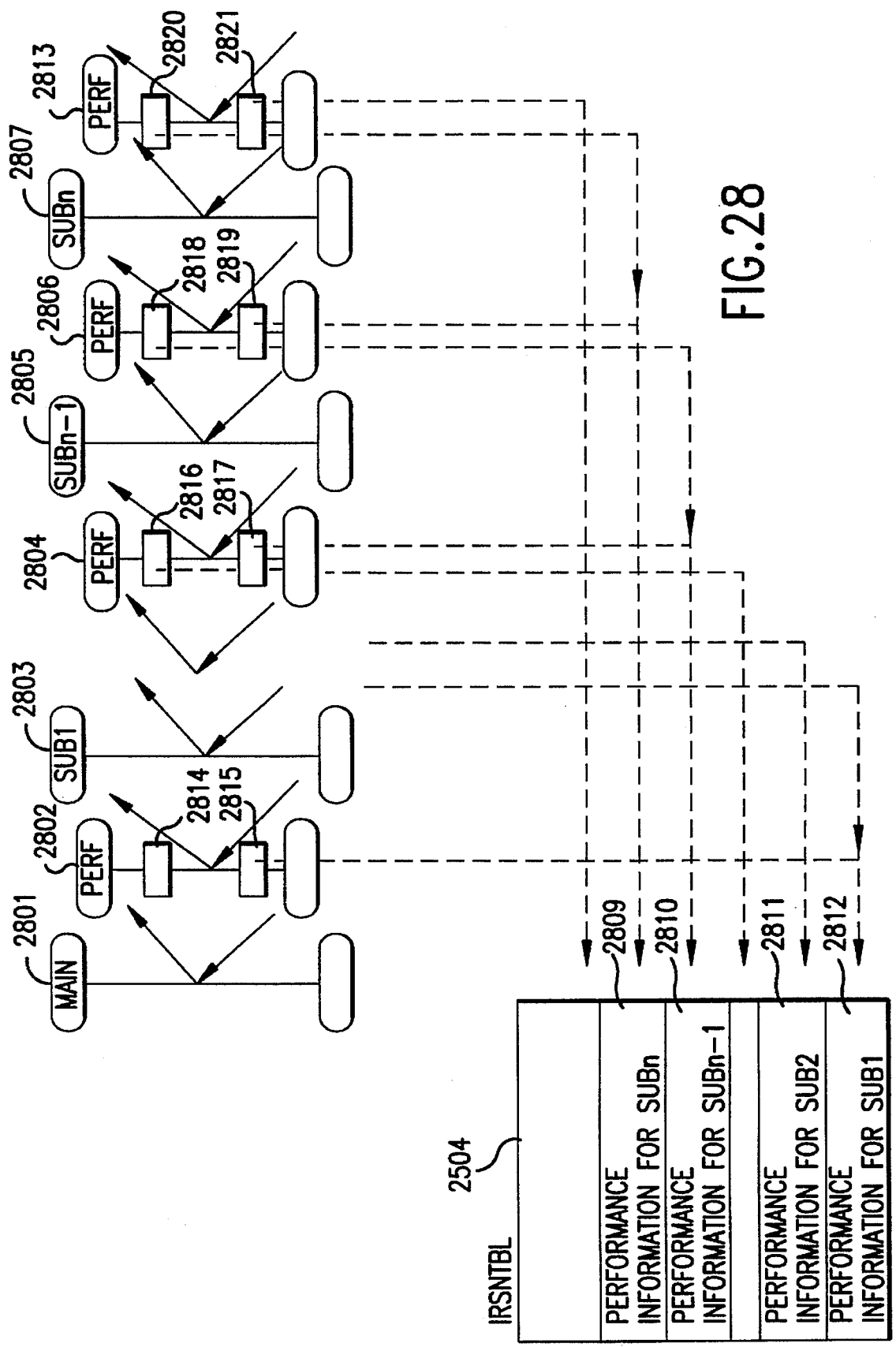
FIG. 28 is a flow chart of subprogram nest processing.

FIG. 28 illustrates the processing in the case where the subprograms are called as the nest. Let's consider a program structure in which a subprogram SUB1 (2803) is called through a performance measurement program PERF 2802 by a program MAIN 2801 forming the process or task, and in which similar calls are iterated until subprograms SUBn-1 (2805) thru SUBn (2807) are finally called. Regarding the program structure, when the subprogram SUBn-1 (2805) is viewed, the performance counter 104 is reset by the performance counter reset processing 2816 of a performance measurement program PERF 2804 before this subprogram SUBn-1 (2805) is called. Subsequently, in a case where the subprogram SUBn-1 (2805) is to call the subprogram SUBn (2807), it calls a performance measurement program PERF 2806 for the subprogram SUBn (2807). A measured value derived by the processing 2818 of the program PERF 2806 for resetting the counter and obtaining the measured value, concerns the subprogram SUBn-1 (2805), namely, the parent of the subprogram SUBn (2807). Therefore, the measured value is added to the performance information of an entry 2810 for the subprogram SUBn-1 (2805) in the table IRSNTBL 2504. Further, the program PERF 2806 calls the subprogram SUBn (2807). It resets the performance counter 104 and obtains a measured value (2819) at the time point of a return from the subprogram SUBn (2807). Since the measured value on this occasion concerns the subprogram SUBn (2807), it is added to the performance information of an entry 2809 for subprogram SUBn (2807). Likewise, since a measured value derived by the processing 2817 of the program PERF 2804 for resetting the performance counter 104 and obtaining the measured value concerns the subprogram SUBn-1 (2805), it is added to the performance information of the entry 2810 for subprogram SUBn-1 (2805). Owing to the above processing flow, the performance information items of all the subprograms belonging to the program MAIN 2801 can be acquired as the performance information items of the calling subprograms.

As stated above, the foregoing embodiment can obtain the performance information items of the individual programs and subprograms without changing the structures or operating environments thereof.

That is, the computer system wherein the central processors are installed is furnished with the performance measurement validation register which serves to indicate whether the performance measurement function is valid or invalid. When the validity of the measurement function is indicated by the register, the control circuit operates one loop of the duplex configuration as the performance measurement facility, and when the invalidity is indicated, the control circuit operates both the loops of the duplex configuration as the central processors. In this way, even during the performance measurement, the computer system can be operated in the same operating environment as in the case where the performance measurement is not executed.

Figure 29:
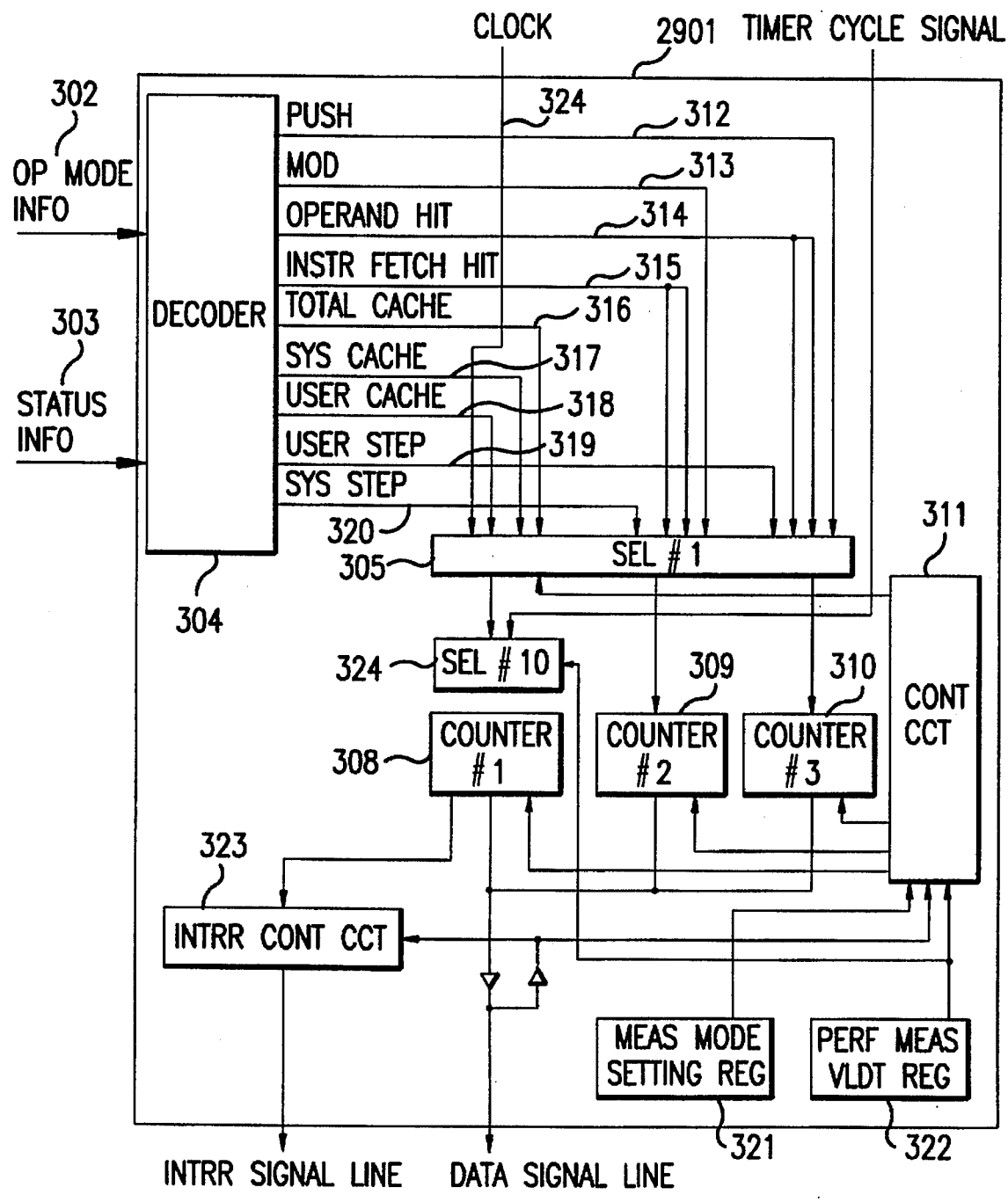
FIG. 29 is a block diagram of the performance measurement facility of a computer system which includes a single processor.

The foregoing embodiment is the computer system in the case where the plurality of processors are comprised. As another embodiment, however, a computer system can comprise a single processor. The fundamental construction of the performance measurement facility 2901 of the computer system is illustrated in FIG. 29. The performance measurement facility 2901 has the function of accepting information for a performance measurement and then executing the performance measurement, and the function of executing processing other than the performance measurement. This performance measurement facility 2901 includes a decoder 304, a performance measurement validation register 322 which accepts an instruction indicating if the performance measurement is to be executed, a measurement mode setting register 321 which is means for accepting the performance measurement mode, a control circuit 311 which receives the above instruction and which causes the performance measurement means to execute the performance measurement when this performance measurement is to be executed and to execute the processing other than the performance measurement when this performance measurement is not to be executed, a selector #10 (324), and counters #1 (308)–#3 (310) which accept and store performance information.

In a case where the performance measurement validation register 322 is reset, a timer cycle signal is input to the counter #1 (308) by the selector #10 (324), and the counter #1 (308) operates as a timer counter for controls etc.

The counter #1 (308) is utilized, for example, when the user wants to display the performance information every fixed time period (e.g., 10 [sec.]). In this example, the counter #1 (308) undergoes interrupts at the regular intervals of the time period and makes the lapses of the fixed time period known to the user.

The output of the counter #1 (308) is entered into an interrupt control circuit 323. The interrupt control circuit 323 generates an interrupt signal upon judging the occurrence of an interrupt from the output of the counter #1 (308). Subsequently, the interrupt control circuit 323 sends the interrupt signal to the processor. The interrupt signal is transferred to the processor through an interrupt signal line.

On the other hand, in a case where the performance measurement validation register 322 is set, the performance information is input to the counter #1 (308) by the selector #10 (324).

Owing to the above operations, the counter #1 (308) can be shared by the performance measurement function and the central processor function.

According to the present invention, a shared circuit is adopted, and a mode setting register is disposed so as to obtain those kinds of information which are larger in number than counters. Therefore, a side on which a system is designed and fabricated has the merit that the amount of mounting can be reduced. The reduced amount of mounting results in the effect that a performance measurement facility can be installed in a duplex central processor with a limited amount of mounting.

As another effect, those kinds of performance information which are larger in number than registers can be obtained with the limited number of registers in such a way that the kind of performance information to be obtained is set in the measurement mode setting register.

Moreover, the performance information items in the actual operating states of the system are obtained as to subprograms which are called by a plurality of processes or tasks. A further effect is that the performance information on a program being actually run can be obtained since a time point designated by the measurer or user of the system and at time intervals designated by him/her. This effect brings the side of the user the merit that performance adjusting operations can be efficiently carried out.

What is claimed is:

1. An information processing system having a plurality of performance measurement modes, comprising:

a plurality of performance measurement means, each executing a performance measurement of said information processing system, and executing processing which is other than said performance measurement;

performance measurement instruction acceptance means for accepting a first instruction which indicates if said performance measurement is to be executed;

performance measurement mode acceptance means for accepting a second instruction indicative of one of said performance measurement modes;

control means for receiving the first and second instructions so as to select one of said plurality of performance measurement means to execute said performance measurement based on the second instruction indicative of the performance measurement mode and so as to select the other of said plurality of performance measurement means to execute the processing other than said performance measurement while said performance measurement is to be executed, the selected one of said performance measurement means obtaining performance information as a result of the execution of the performance measurement;

a memory accepting and storing said performance information.

2. An information processing system in accordance with claim 1, said performance measurement means including at least one selector which receives a plurality of performance information items and selects one item therefrom in accordance with said second instruction.

3. An information processing system in accordance with claim 2, wherein said performance measurement modes include a first mode for measuring executed steps, a second mode for measuring a number of times of hits to a cache memory connected to the information processing system, and a third mode for measuring a number of times of modifications of cache data.

4. An information processing system in accordance with claim 2, wherein said plurality of performance information items includes at least two of a number of times which cache data have been written into a main memory, a number of times which the cache data have been modified, a number of times of cache access, a number of times of cache hits, and a number of times of modifications of cache data.

5. An information processing system in accordance with claim 4, said performance measurement means including at least one counter which receives one of said performance information items from said selector and counts the number of times, said counter being used as a timer when said performance measurement means is executing processing other than said performance measurement.

6. An information processing system in accordance with claim 2, wherein said counter functions as said memory means by maintaining a counted value.

7. A method for measuring performance measurement using an information processing system including a plurality of performance measurement facilities and having a plurality of performance measurement modes comprising steps of:

accepting a first instruction which indicates if said performance measurement is to be executed;

accepting a second instruction indicative of one of said performance measurement modes;

in response to said first instruction, selecting one of said plurality of performance measurement facilities to cause it to execute said performance measurement based on the second instruction indicative of the performance measurement mode and causing the other of said plurality of performance measurement facilities to execute processing other than said performance measurement while said performance measurement is to be executed;

obtaining performance information as a result of the execution of the performance measurement; and storing said performance information in a memory.

* * * * *

UNITED STATES PATENT AND TRADEMARK OFFICE
CERTIFICATE OF CORRECTION

PATENT NO. : 5,651,112
DATED : July, 22, 1997
INVENTOR(S) : Atsushi Matsuno, et al It is certified that error appears in the above-indentified patent and that said Letters Patent is hereby corrected as shown below:

Column 24, line 30, "claim 2" should read -- claim 5 --.

Signed and Sealed this

Third Day of February, 1998

BRUCE LEHMAN

*Attest:*

*Attesting Officer*   *Commissioner of Patents and Trademarks*